United States Patent [19]

Sakamoto

[11] 3,798,553

[45] Mar. 19, 1974

[54] FREQUENCY SWEEP DEVICE HAVING TWO ALTERNATELY SWEPT OSCILLATORS

[75] Inventor: Yoichi Sakamoto, Osaka, Japan

[73] Assignee: Matsushita Electric Industrial Co., Osaka, Japan

[22] Filed: Feb. 8, 1972

[21] Appl. No.: 224,454

[30] Foreign Application Priority Data

| | | |
|---|---|---|
| Feb. 9, 1971 | Japan | 46/5738 |
| Feb. 9, 1971 | Japan | 46/5739 |
| Feb. 9, 1971 | Japan | 46/5740 |
| Feb. 9, 1971 | Japan | 46/5741 |
| Feb. 9, 1971 | Japan | 46/5742 |
| Feb. 9, 1971 | Japan | 46/5743 |
| Feb. 9, 1971 | Japan | 46/5745 |
| Feb. 9, 1971 | Japan | 46/5753 |
| Mar. 3, 1971 | Japan | 46/11430 |
| Mar. 3, 1971 | Japan | 46/11431 |
| Mar. 3, 1971 | Japan | 46/11432 |
| Mar. 5, 1971 | Japan | 46/11900 |
| Mar. 5, 1971 | Japan | 46/11901 |
| Mar. 5, 1971 | Japan | 46/11902 |
| June 25, 1971 | Japan | 46/46140 |
| June 25, 1971 | Japan | 46/46141 |
| June 25, 1971 | Japan | 46/46142 |
| June 25, 1971 | Japan | 46/46143 |
| Jan. 13, 1972 | Japan | 47/6300 |
| Jan. 13, 1972 | Japan | 47/6301 |
| Jan. 13, 1972 | Japan | 47/6302 |

[52] U.S. Cl. ................. 325/453, 325/421, 325/423, 325/455, 325/468, 328/133, 331/2, 331/4, 331/55, 334/28, 334/86

[51] Int. Cl. ............................................. H04b 1/16

[58] Field of Search .................... 325/418, 421–423, 325/332, 334, 337, 453, 455, 457, 468, 346; 328/133; 331/2, 4, 55; 334/18, 21, 22, 28, 86

[56] References Cited

UNITED STATES PATENTS

| | | | |
|---|---|---|---|
| 3,611,152 | 10/1971 | Sakai | 325/422 |
| 2,994,766 | 8/1961 | McCoy | 325/334 |
| 3,665,318 | 5/1972 | Hoffman | 325/334 |
| 2,661,419 | 4/1949 | Tongue | 325/332 |

*Primary Examiner*—Albert J. Mayer
*Attorney, Agent, or Firm*—Milton J. Wayne

[57] ABSTRACT

The frequency sweep operation by two frequency sweep oscillators is reversed whenever the difference in oscillation frequency between the two oscillators reaches a predetermined frequency so that they alternately sweep the frequency step by step. The frequency sweep oscillator device is best suited for use in an automatic channel selector for a television receiver.

21 Claims, 41 Drawing Figures

FREQUENCY SWEEP DEVICE HAVING TWO ALTERNATELY SWEPT OSCILLATORS

SUMMARY OF THE INVENTION

The present invention relates to a frequency sweep local oscillator; 164, a second voltage sweep adapted for use in an automatic channel selector for a television receiver.

In general in the prior art automatic channel selector for a television receiver, the sweep voltage is applied across a variable capacitance diode so that the sweep of the tuned frequency of the frequency sweep oscillator may be accomplished in response to the variation in capacitance of the variable capacitance diode, and when the tuner is tuned to a desired frequency, a predetermined intermediate frequency signal is generated and is detected to stop the frequency sweep. However, this prior art channel selector has a defect that the digital indication of a selected channel number is very difficult.

SUMMARY OF THE INVENTION

One of the objects of the present invention is to provide a frequency sweep best suited for use in an automatic channel selector for a television receiver capable of indicating a selected channel number.

Another object of the present invention is to provide a frequency sweep oscillator device whose operation can be accurately controlled in a very reliable manner.

A further object of the present invention is to overcome various problems encountered in the prior art frequency sweep devices.

Briefly stated, according to the present invention there are provided two frequency sweep oscillators, and the frequency sweep operation by these two frequency sweep oscillators is reversed when the difference in oscillation frequency between these two oscillators reaches a predetermined frequency so that the frequencies of the two oscillators may be increased stepwise.

In case that the difference between the frequencies of the two oscillators when the frequency sweep operation is stopped is so selected as to be equal to $1/n$ (*n:* positive integers) of the difference between the adjacent carrier frequency of the television system, the oscillation frequencies of the two oscillators may be used for selecting a desired channel number on a television receiver.

The frequency sweep operation by the two oscillators is automatically stopped when the number of reversal in the frequency sweep operation reaches a number corresponding to a desired channel number. When the desired channel is selected, it is indicated digitally.

The above and other objects, effects and features of the present invention will become more apparent from the following description of the preferred embodiments thereof taken in conjunction with the accompanying drawings.

DESCRIPTION OF THE PREFERRED EMBODIMENTS

Figures 1A, 1D:
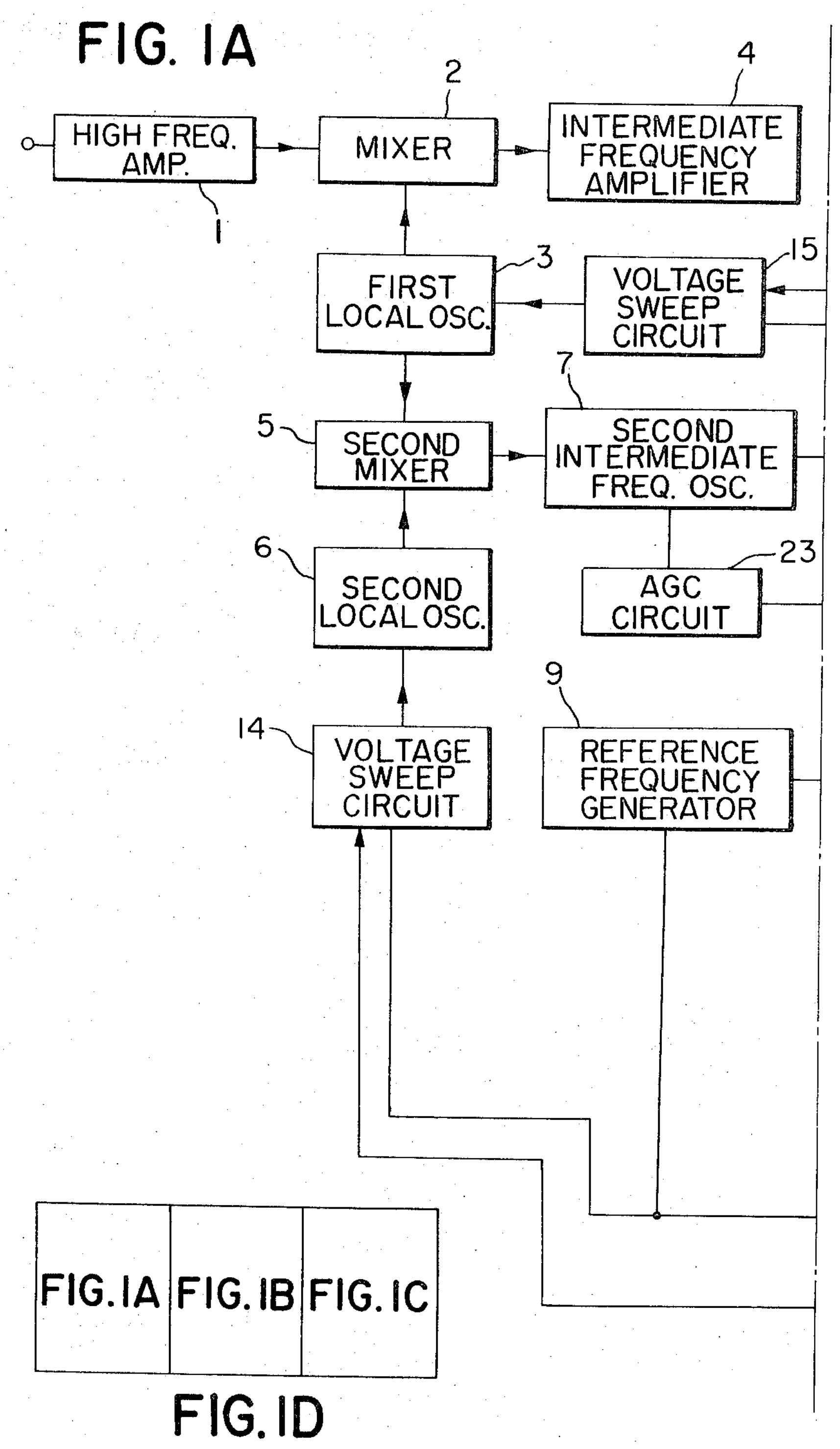
FIG. 1 is a block diagram of an automatic channel selector for a television receiver to which is applied an frequency sweep device in accordance with the present invention.
Figure 1B:
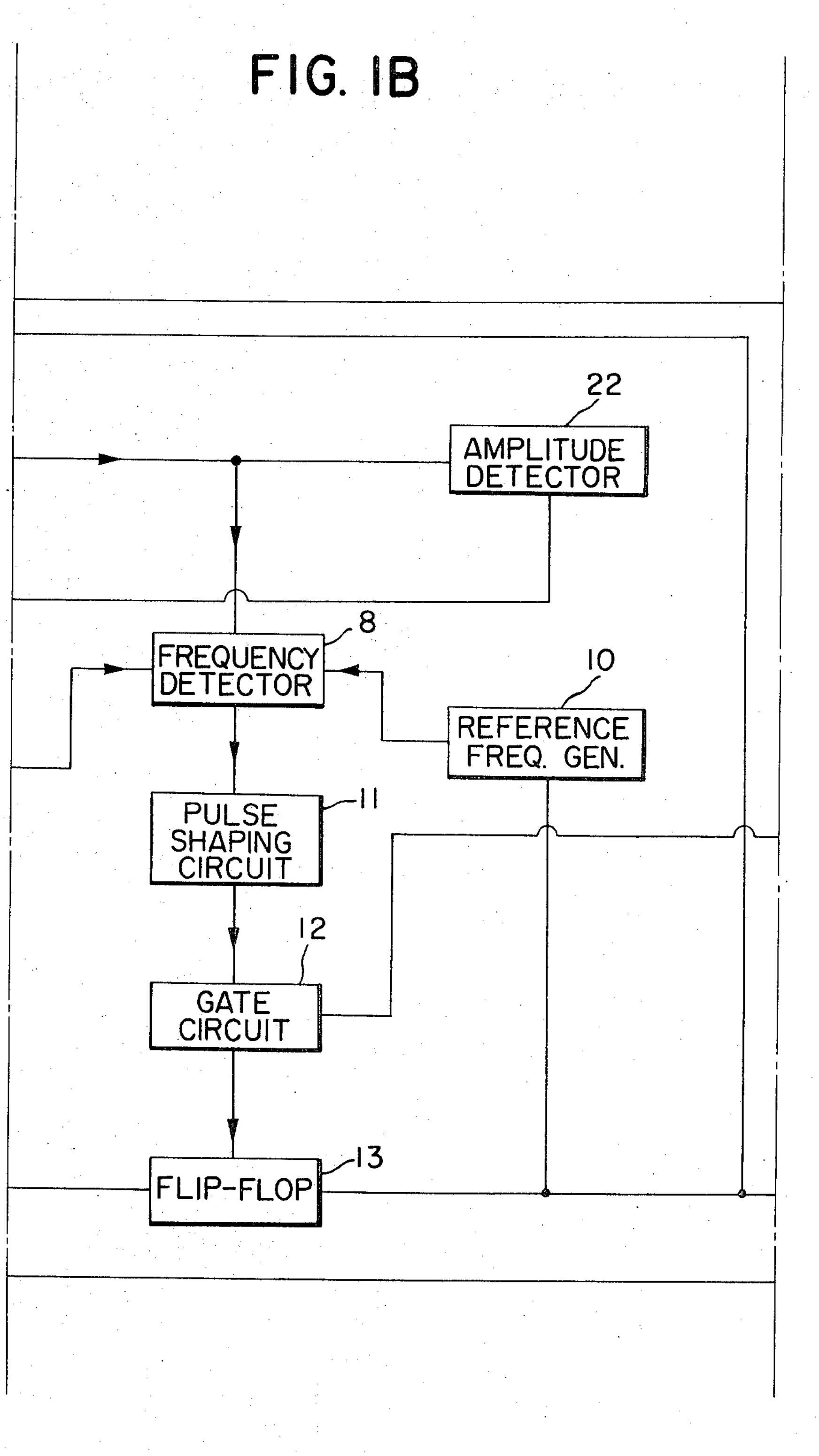
Figure 1C:
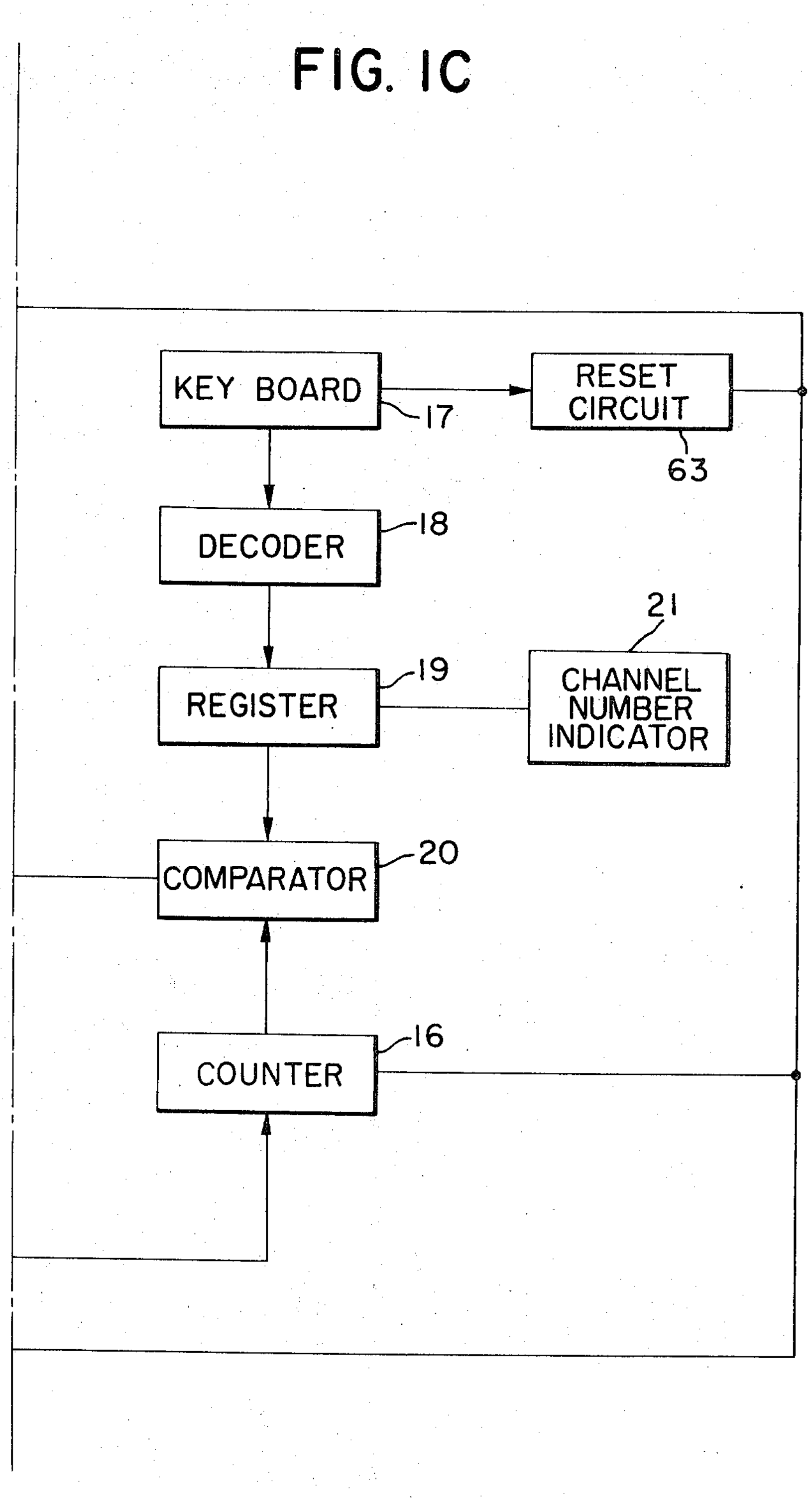

An automatic channel selector shown in FIG. 1 comprises a high-frequency amplifier 1, a mixer 2, a first local oscillator 3, an intermediate amplifier 4, a second mixer 5, a second local oscillator 6, a second intermediate frequency amplifier 7, a frequency detector such as a phase detector 8, reference frequency generators 9 and 10, a pulse shaping circuit 11, a gate circuit 12, a flip-flop 13, and voltage sweep circuits 14 and 15 whose operations are controlled in response to the outputs from the flip-flop 13. In a practical circuit, the output terminals of the first and second local oscillators 3 and 6 are connected to the input terminals of the second mixer 5 through capacitors respectively, and the reference frequency generators 9 and 10 generate the reference frequencies $f_1$ and $f_2$ respectively.

Figure 2:
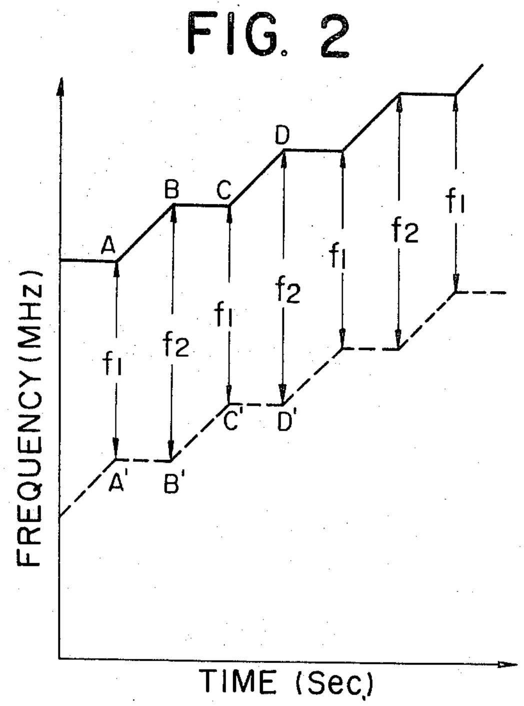
FIG. 2 is a graph used for explanation of the mode of operation thereof.

The first and second local oscillators 3 and 6 sweep the frequencies as shown in FIG. 2 in which the oscillation frequency of the first local oscillator 3 is indicated by the solid curves whereas the oscillation frequency of the second local oscillator by the dotted curves. In this case, it is assumed that the automatic channel selector start to function with the first local oscillator 3 de-activated and the second oscillator 6 activated and with the difference in oscillation frequency between the first and second local oscillators 3 and 6 being a frequency between the predetermined reference frequencies $f_1$ and $f_2$. When the reference frequencies $f_1$ and $f_2$ are within the bandwidth of the second intermediate frequency amplifier, the frequency detector 8 detects the output frequency $f_1$ of the intermediate frequency amplifier 7 when the difference between the oscillations frequencies becomes $f_1$. The output of the frequency detector 8 is shaped into a pulse by the pulse shaping circuit 11 the pulse output of which is applied to the flip-flop 13 through the gate circuit 12 to reverse the flip-flop 13. In response to the reversal of the flip-flop 13, the operations of the local oscillators are reversed. That is, the first local oscillator 3 starts to sweep, whereas the sweep by the second local oscillator 6 is de-activated at A and A′ in FIG. 2.

When the oscillation frequency of the first local oscillator 3 reaches the point B whereas the oscillation frequency of the second local oscillator 6 reaches the point B, the difference reaches $f_2$, and is detected by the frequency detector 8. The output of the frequency detector 8 is shaped by the pulse shaping circuit 11, and is applied to the flip-flop 13 through the gate circuit 12. Therefore, in the manner described above, the operations of the first and second local oscillators are reversed at the points B and B′.

Figure 3:
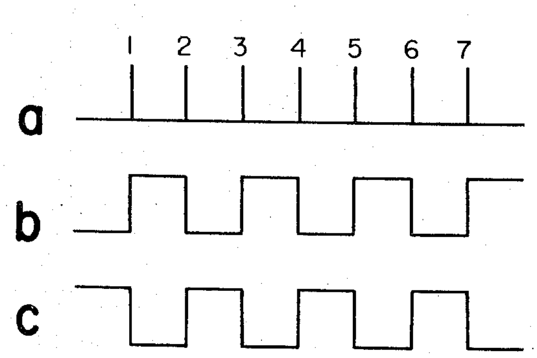
FIG. 3 illustrates various waveforms used for explanation of the mode of operation of the channel selector shown in FIG. 1.

In FIG. 3, *a* illustrates the output of the frequency detector 8; *b* illustrates the output of the first sweep terminal; and *c* illustrates the output of the second sweep terminal.

When the difference between the two reference frequencies $f_1$ and $f_2$ is equal to the channel width frequency, the difference between the oscillation frequency at the point A of the first local oscillator and the oscillation frequency between the points B and C becomes the difference between the adjacent channel carriers. When the oscillation frequency at the point A is correctly selected, the first local oscillator 3 is de-activated whenever the difference between the oscillation frequencies reaches the difference between the adjacent channel carriers as shown by the frequency in the time interval BC. The oscillation frequencies in such time intervals are the reference frequencies of the chanels. In order to count and indicate the channel numbers, the outputs of the flip-flop 13 are applied to a counter 16.

In order to stop the sweep at a desired channel and to indicate the selected channel, the following method is for example employed. A desired channel number is set on a keyboard 17, and the output of the keyboard 17 is applied to a register 19 through a decoder 18. When the content in the register 19 coincides with the content in the counter 16, the coincidence signal is generated from a comparator 20, and when they are not coincident with each other, the non-coincidence signal is generated. These signals are applied to the gate 12. If the coincidence signal is applied, the gate 12 is turned off whereas when the non-coincidence signal is applied, the gate 12 is turned on. When the sweep frequency reaches the frequency of a desired channel, the flip-flop 13 is de-activated so that the sweep operation is also stopped. The content of the register 19 is displayed by a channel number indicator 21.

The counter 16, and first and second voltage sweep circuits 15 and 14 are reset by a reset circuit 63 when the channel selection is started. Thus, the counter 16 is reset to the lowest channel number, and the first local oscillator 3 oscillates at the frequency corresponding to the lowest channel whereas the second local oscillator is so set as to start to oscillate at the frequency equal to the difference frequency $f_1$ or $f_2$ between the two local oscillators 3 and 6. When the voltage sweep circuits 14 and 15 are reset to the lowest voltages, the reference voltages of low output impedance are applied to the anodes of variable capacitance diodes in the first and second local oscillators 3 and 6.

Reference numeral 22 designates an amplitude detector, and 23, an AGC circuit to control the gain of the intermediate frequency amplifier 7. A gain control circuit (not shown) may be inserted between the second local oscillator 6 and the mixer 5.

Figure 4A:
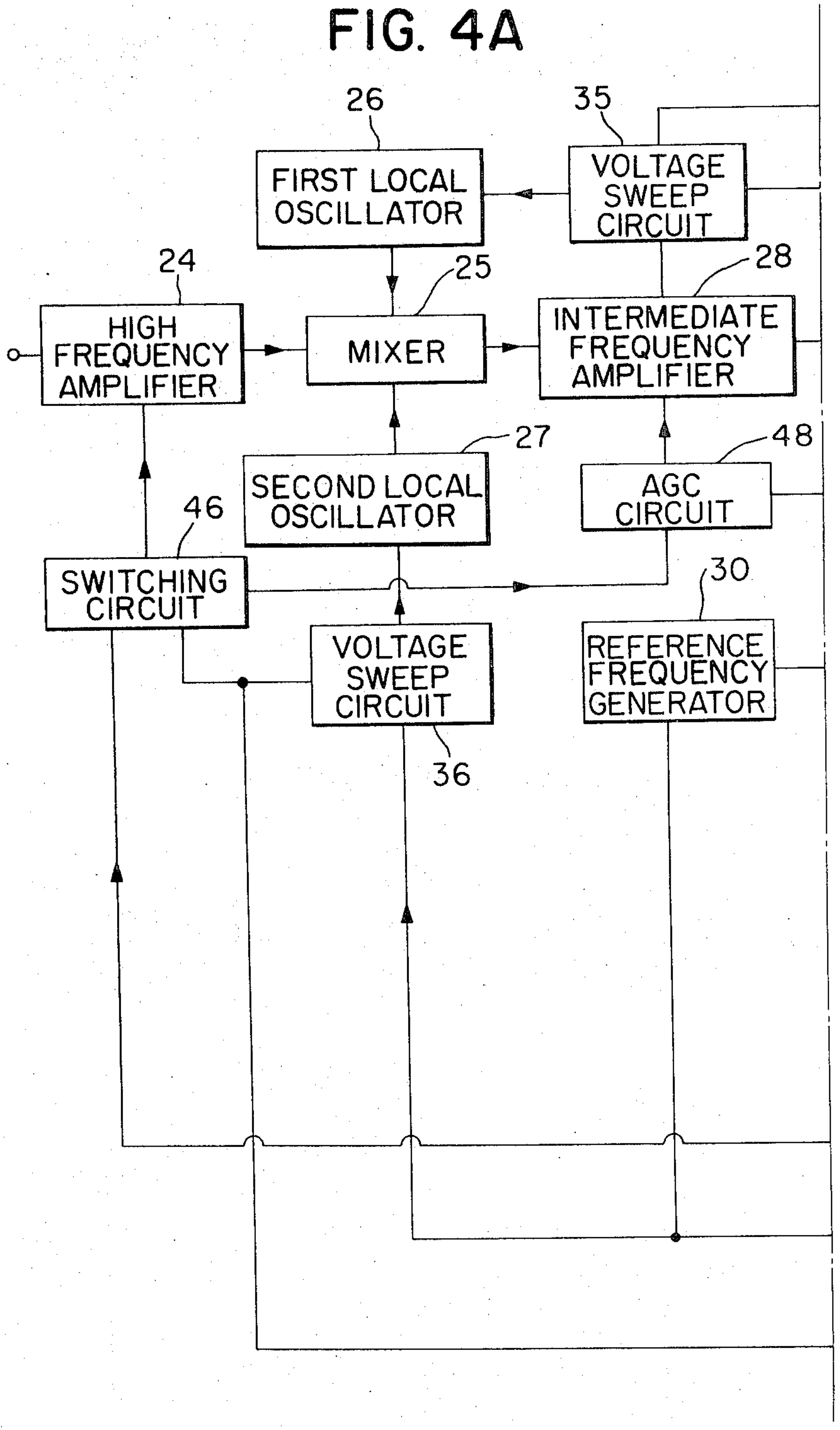
FIGS. 4A–4C are a block diagram of another channel selector to which is applied a frequency detector in accordance with the present invention.
Figure 4B:
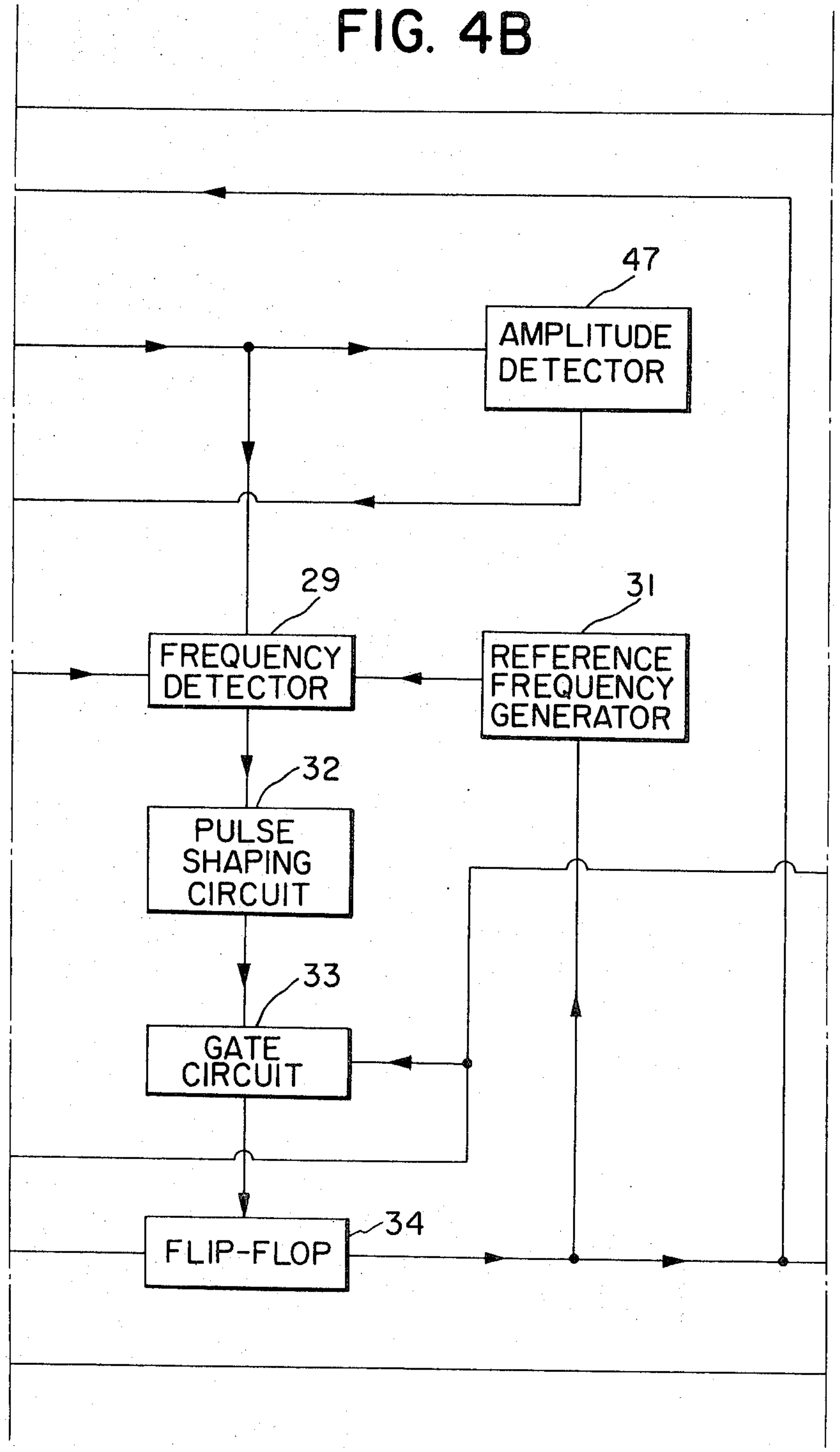
Figures 4C, 4D:
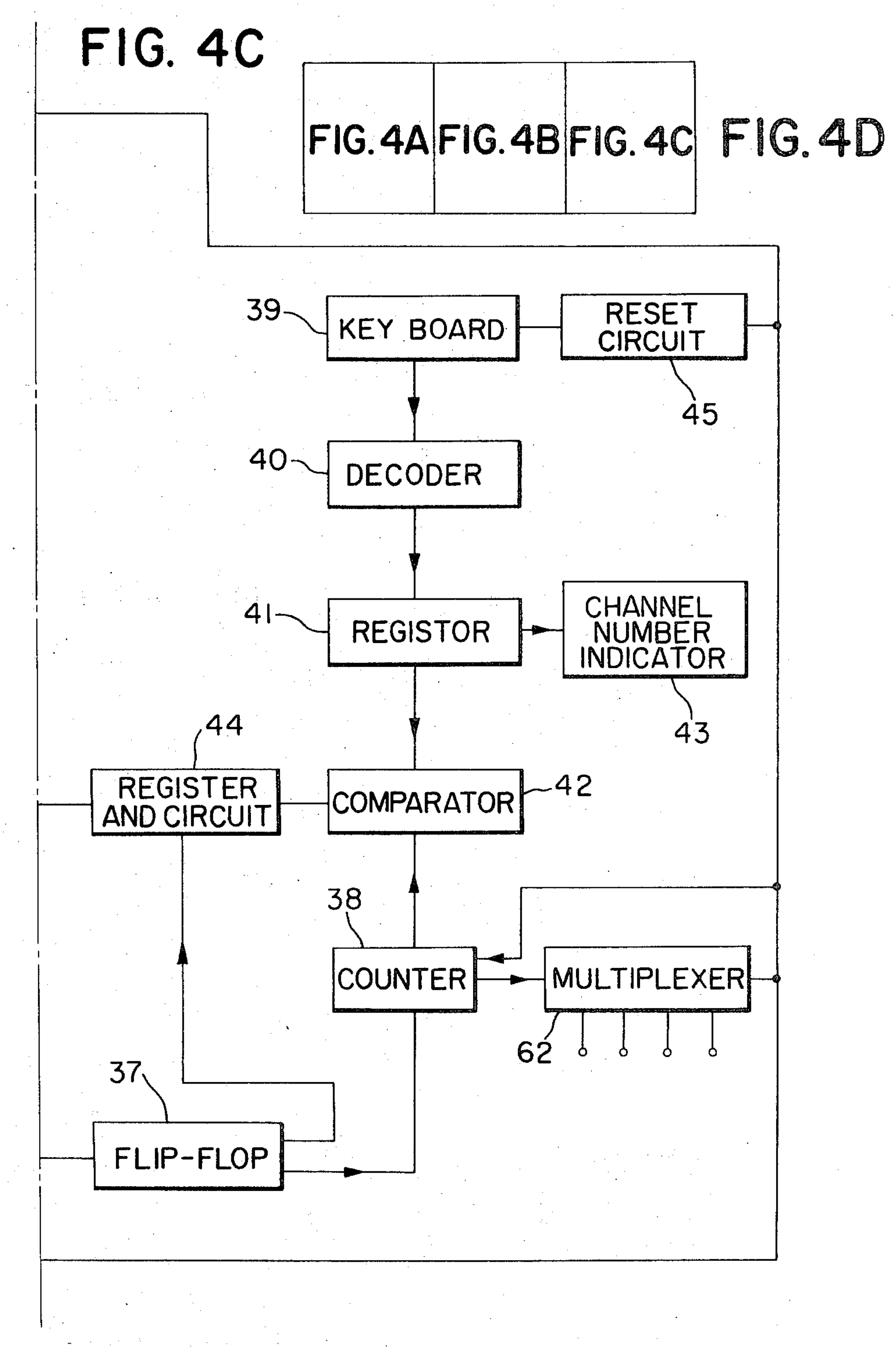

In an automatic channel selector shown in FIGS. 4A–4C, the intermediate amplifier in a television receiver is used as the second intermediate frequency amplifier of the channel selector shown in FIG. 1. The bandwidth of the second intermediate frequency amplifier shown in FIG. 1 may be selected freely to some extent, so that the difference between the reference frequencies $f_1$ and $f_2$ can be made equal to the difference between the adjacent channel carriers. This will become impossible when the intermediate frequency amplifier of the television receiver is used instead of the second intermediate frequency amplifier 7. For example, the channel width is 6 MHz and the bandwidth of the intermediate frequency amplifier is 4 MHz. Furthermore, when the intermediate frequency amplifier in the television receiver is used, the received waves must be distinguished from the input from the second local oscillator.

Referring to FIGS. 4A–4C, reference numeral 24 designates an high frequency amplifier; 25, a mixer; 26, a first local oscillator; 27, a second local oscillator; 28, an intermediate frequency amplifier; 29, a frequency detector; 30 and 31, reference frequency generators for the frequency detector 29; 32, a pulse shaping circuit; 33, a gate circuit; 34, a flip-flop; and 35 and 36, voltage sweep circuits whose operations are controlled in response to the outputs of the flip-flop 34. The outputs of the first and second local oscillators 26 and 27 are applied through capacitors to the input terminals of the mixer 25 in a practical circuit.

Figure 5:
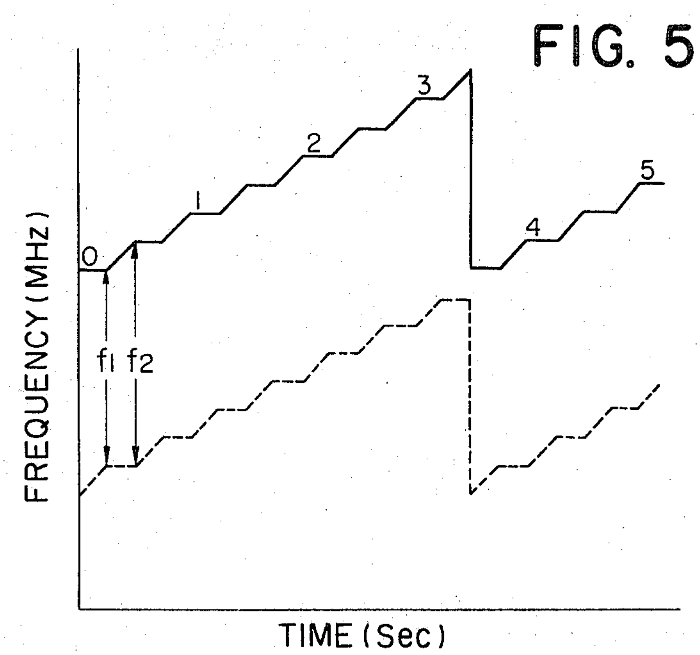
FIG. 5 is a graph used for explanation of the mode of operation thereof.

The difference between the oscillation frequencies of the first and second local oscillators 26 and 27 is $f_1$ and $f_2$, and the oscillation frequency of the first local oscillator 26 is indicated by the solid line curves whereas that of the second local oscillator 27, by the dotted line curve in FIG. 5. The reason why the first and second local oscillators operate in such a manner as indicated in FIG. 5 has been explained with reference to FIGS. 1A–1C and 2 so that no further explanation will be made.

Figure 6:
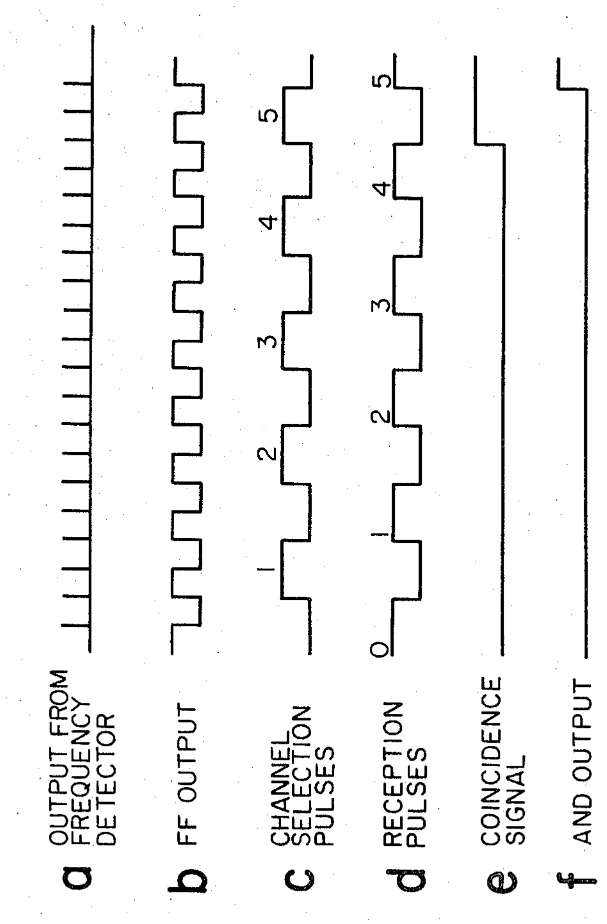
FIG. 6 is a graph illustrating various waveforms used for explanation of the mode of operation thereof.

When the difference between the two reference frequencies $f_1$ and $f_2$ is selected to be equal to one half of the difference between the adjacent channel carriers, the difference between the adjacent steps in FIG. 5 becomes equal to one half of the difference between the adjacent channel carriers. Therefore, it becomes necessary to generate the channel counting signal for each channel width. For this purpose, means for dividing the output of the flip-flop 34 into a half such as a flip-flop 37 is provided, and the output of the flip-flop 37 is applied to a counter 38, which corresponds to the counter 16 shown in FIG. 1. Elements 39, 40, 41, 42 and 43 correspond to the elements 17, 18, 19 20 and 21 respectively shown in FIG. 1. As shown in FIG. 1, the channel advance pulses are applied to the counter 38. If the channel number set by a keyboard 39 coincides with the content in the counter 38, the coincidence signal is generated from a comparator 42. For example, when the channel "5" is set by 39, the output is derived in response to the coincidence signal shown by *e* in FIG. 6. The leading edge of the coincidence signal *e* coincides with that of the channel advance or selection pulse 5 shown by *c* in FIG. 6. The reception pulse *d* shown in FIG. 6 is applied from the flip-flop 37 to an AND gate 44, the output of which is shown by *f* in FIG. 6. The leading edge of the output *f* coincides with that of the reception pulse 5 shown by *d* in FIG. 6. In response to the AND output *f*, the gate 33 is turned on. As a result, the sweep operation continues until the carrier frequency of the channel 5 is reached, and then is stopped. The channel number indicator 43 indicates that the channel 5 is being received. In FIG. 6, the output of the frequency detector 29 is indicated at *a*, and the output of the flip-flop 34, at *b*.

In television broadcasting, the channels are divided into a few bands. For example, in Japan, the channels 1–3 belong to the lower VHF band, while the channels above 4 belong to the upper VHF band. Therefore, the output of the counter 38 is applied to a multiplexer 62 whose output is generated so as to coincide with the leading edge of the channel advance or selection pulse, and the first and second local oscillators 26 and 27 are so controlled in response to the output of the multiplexer 62 as to oscillate at appropriate reference frequencies. FIG. 5 shows the switching from the channel 3 to the channel 4.

In response to the outputs from the multiplexer 62, which are applied to an OR circuit to which is also applied the output of the reset circuit 45, the counter 38 and the first and second voltage sweep circuits 35 and 36 are reset in the manner substantially similar to that described hereinbefore. Furthermore, the outputs of the multiplexer 62 serve to switch the bands at which operate the first and second local oscillator, the high frequency amplifier, mixer and so on, which is required for reception and tuning. For televison channel selection, four terminals of the multiplexer 62 shown in FIG. 3 corresponds to the UHF band, the lower VHF band, the upper VHF band (channels 4–7), and the upper VHF band (channel 8–12).

A circuit 45 is a circuit for generating reset pulses when the keyboard 39 is operated so that the counter 38 and the voltage sweep circuits 35 and 36 are reset. As a result, the channel selection operation described hereinbefore may be started from the channel zero, and simultaneously a switching circuit 46 is activated so that the AGC voltage applied to the high frequency amplifier 24 can be attenuated to the maximum value, and the AGC circuit 48 which operates in response to the signal from the frequency detector 47 is activated. Instead of attenuating the AGC voltage to be applied to the high frequency amplifier 24, the latter may be disconnected from its power source. When the sweep to the carrier frequency of a desired channel is accomplished, the output is derived from the AND circuit 44 to reset the switching circuit 46.

Figure 7:
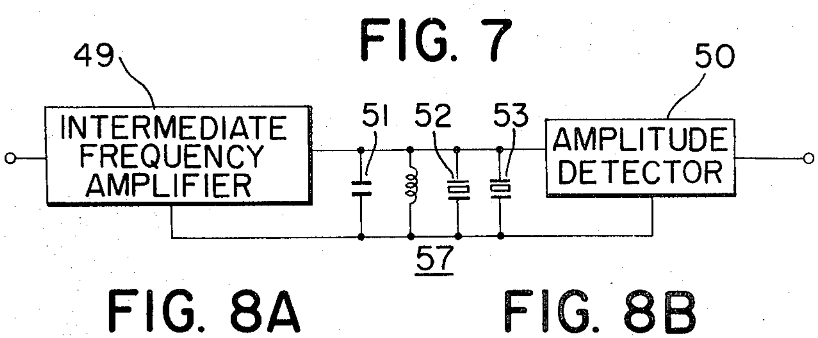
FIG. 7 is a circuit diagram of a frequency detector which had been invented prior to that of the present invention.
Figure 8A:
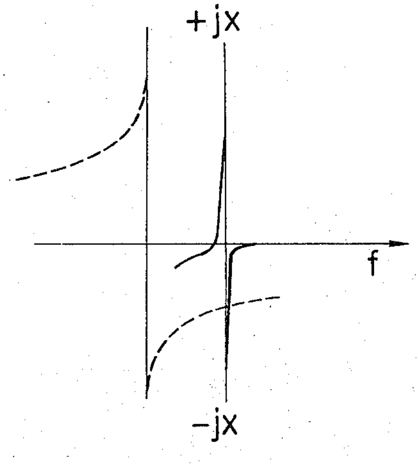
FIGS. 8A and 8B are graphs used for explanation of the mode of operation thereof.
Figure 8B:
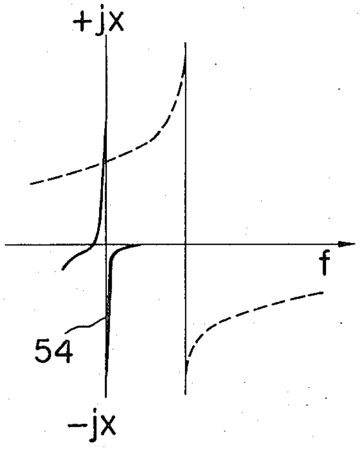

In the automatic channel selectors of the type described with reference to FIGS. 1A–1C and 4, the phase detectors 8 and 29 are employed, and the oscillators which are controlled with a higher degree of accuracy are used to generate the reference frequencies $f_1$ and $f_2$. The construction becomes simple when a circuit shown in FIG. 7 is used. In FIG. 7, reference numeral 49 designates an intermediate frequency amplifier; 50, an amplitude detector; 57, a tuning circuit which is a load of the intermediate frequency amplifier 49; and 52 and 53, piezo-resonators such as crystal or ceramic resonators. When the tuned frequency of the tuning circuit 57 is higher than the resonant frequencies of the resonators 52 and 53, the impedance of the tuning circuit 51 is inductive at or near the resonant frequencies and anti-resonant frequencies of the resonators 52 and 53. Since the resonators have a high Q the capacitive reactance of the anti-resonance impedances of the resonators 52 and 53 become greater in an extremely narrow frequency range at or near the anti-resonant frequencies as shown in FIG. 8B. The impedance characteristics of the piezo-resonators 52 and 53 and the tuning circuit 51 are indicated by the solid and dotted curves, respectively. The increase in capacitive reactance explained above is indicated by 54. This portion is applied as a trap to the intermediate frequency amplifier 49 so that the output of the detector 50 is deprived of the frequencies corresponding to the anti-resonance frequencies of the resonators 52 and 53. When these frequencies are detected, the circuit shown in FIG. 7 functions as a frequency detector. The resonators 52 and 53 are selected so as to have the anti-resonance frequencies corresponding to the reference frequencies $f_1$ and $f_2$. If the tuned frequency of the tuning circuit 51 is lower than the anti-resonance frequency of the resonator 52 or 53, the impedance becomes capactive at or near the resonance frequencies of the piezo-resonators 52 and 53 as shown in FIG. 8A so that the detection of the capacitive components of the piezo-resonators 52 and 53 becomes difficult. The accuracy of the reference frequencies $f_1$ and $f_2$ is not so critical, other trap circuits such as LC trap circuits may be used in place of the resonators 52 and 53.

Figures 9, 13A, 13B:
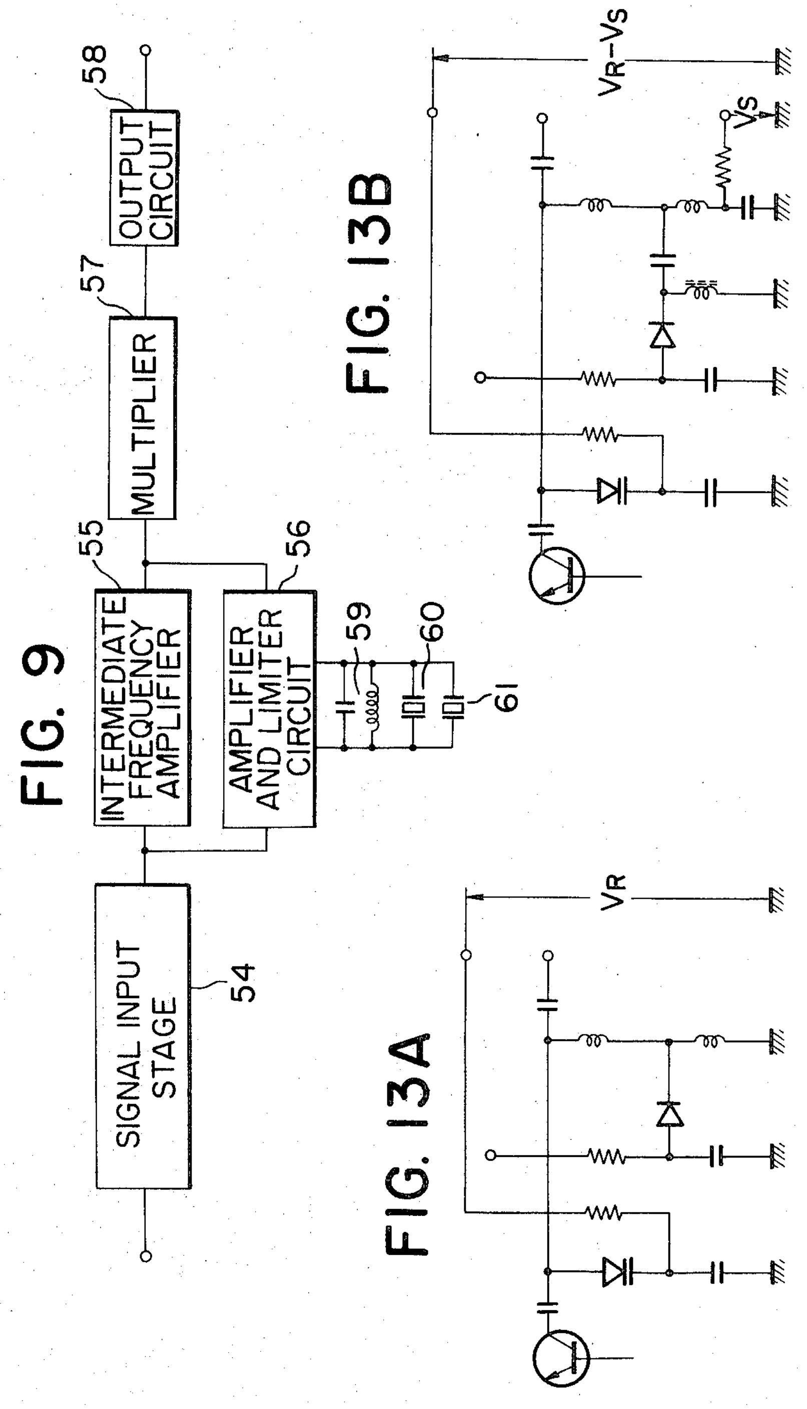
FIG. 9 is a block diagram of a frequency detector in accordance with the present invention.
FIG. 13A is a diagram of a VHF local oscillator in the prior art.
FIG. 13B is a circuit diagram of a VHF local oscillator in accordance with the present invention.

In the embodiment to be described hereinafter, the circuit shown in FIG. 7 is used in order to detect the frequency without the intermediate frequency amplifier being adversely affected. The embodiment is shown in FIG. 9 in which reference numeral 54 designates an intermediate frequency signal input stage consisting of an emitter-follower; 55, an intermediate frequency amplifier; 56, an amplifier and limiter for switching carrier signal, 57, a multiplier circuit for homodyne detection of the output of the intermediate frequency amplifier 55 by the output of the amplifier and limiter 56; and 58, an output circuit comprising an emitter-follower. Reference numeral 59 designates a tuning circuit which is tuned to a picture carrier; and 60 and 61, piezo-resonators having the anti-resonant frequencies $f_1$ and $f_2$. In the case of the circuit shown in FIG. 7, due to the characteristics of the resonators 52 and 53, a trap is formed in the bandwidth of the intermediate frequency amplifier 49 so that the reception is influenced even after a desired channel has been selected. However, in case of the circuit shown in FIG. 7, the path of the intermediate frequency signal is separated from that of the switching signal carrier, and a trap of a very small bandwidth is formed at or near the switching signal carrier by the resonators 60 and 61, the homodyne detection is not adversely affected. Thus, the problems encountered in the circuit shown in FIG. 7 can be overcomed.

Figure 11:
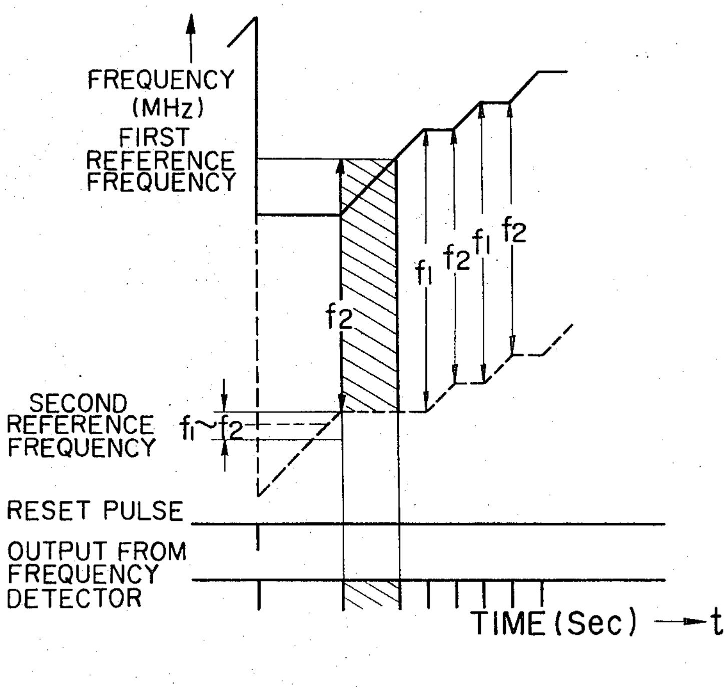
FIG. 11 is a graph used for explanation of the mode of the frequency sweep operation by a first and second local oscillators thereof.
Figure 12:
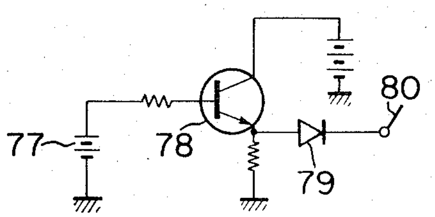
FIG. 12 is a circuit diagram of low output impedance.

Next the embodiment shown in FIGS. 10A and 10B will be described. Reference numeral 64 designates a high frequency amplifier; 65, a mixer; 66, a first local oscillator; 67, a second local oscillator; 68, a first voltage sweep circuit; 69, a second voltage sweep circuit; 70, an intermediate frequency amplifier; 71, a frequency detector; 72 and 73, reference frequency generators for generating the reference frequencies for the frequency detector 71; 74, a pulse shaping circuit; 75, a gate circuit; and 76, a flip-flop. The reference frequencies of the reference frequency generators 72 and 73 being assumed as $f_1$ and $f_2$ respectively, the sweeped frequencies of the local oscillators 66 and 67 will become as shown in FIG. 11. The solid curves indicate the oscillation frequency of the first local oscillator, whereas the dotted curves, the oscillation frequency of the second local oscillator 67. The reason why the frequency is swept as shown in FIG. 11 will be described hereinafter. There are provided two power sources of low output impedances each comprising a reference voltage source 77, an emitter-follower 78, and a diode 79 as shown in FIG. 12, and the output terminals 80 are connected to the output terminals of the first and second voltage sweep circuits 68 and 69 shown in FIGS. 10A and 10B. When the signals are applied as shown in FIG. 11, the two voltage sweep circuits 68 and 69 are reset, so that the voltage drop across the variable capacitance diodes in the first and second local oscillators reaches the ground potential or zero. For example, when a thyristor is used as an element for resetting, the output voltage of the sweep circuit is decreased to substantially zero volt in response to the reset signal. However, the circuit of low output impedance shown in FIG. 12 is connected to the output terminal of the voltage sweep circuit through the diode 79 so that, even when the second voltage sweep circuit 69 is activated, the sweep voltage is not applied to the second local oscillator, but the output or reference voltage of the circuit shown in FIG. 12 is applied. The second reference frequency is the oscillation frequency of the second local oscillator 67 at the reference voltage. The second reference frequency is between the two reference frequencies $f_1$ and $f_2$. If the frequencies $f_1$ and $f_2$ are within the frequency bandwidth of the intermediate frequency amplifier 70, the frequency detector 71 detects the output frequency $f_2$ of the intermediate frequency amplifier 70 when the difference between the oscillation frequencies of the two local oscillators 66 and 67 reaches the frequency $f_2$. The output of the frequency detector 71 is shaped into a pulse by the pulse shaping circuit 74, and is applied through the gate 75 to the flip-flop 76. As a result, the flip-flop 76 is reversed whereby the operations of the voltage sweep circuits are reversed. That is, the first local oscillator 66 starts to sweep, whereas the sweep by the second local oscillator is deactivated to stop the sweep.

The first local oscillator 66 starts the sweep from the frequency corresponding to 0 volt so that it takes a time before the first reference frequency is reached as shown by the hatched portion in FIG. 11. When the difference between the oscillation frequencies of the first and second oscillators 66 and 67 reaches the frequency $f_1$ as the oscillation frequency of the first local oscillator 66 increases, the flip-flop 76 is reversed again in the manner described above, whereby the sweep operation is also reversed. In the similar manner described above, the sweep operations of the first and second local oscillators 66 and 67 are alternately reversed.

The oscillation frequency of the second local oscillator 67 remains $f_2$ until the oscillation frequency of the first local oscillator 66 reaches the first reference frequency. If this operation continues, the malfunction occurs because at frequency $f_2$ infinite numbers of pulses will be kept generated whereas only one pulse must be generated and no other pulse must not be generated until the frequency $f_1$ is reached. Therefore, the discharge time constant of the second voltage sweep circuit 69 when the latter is de-activated is made as small as possible within a tolerable range of the second reference frequency so that the frequency $f_2$ appears only one time during the period described above. When the difference between the two reference frequencies $f_1$ and $f_2$ is made equal to the channel width frequency, the frequency sweep is alternately started and stopped for every channel width. When the first reference frequency is made equal to the frequency of the lowest channel, the carrier frequency of each channel is derived whenever the sweep is completed. When the difference between the two reference frequencies $f_1$ and $f_2$ is made equal to $1/n$ of the channel width frequency, the carrier frequency of each channel can be reached after the number of n sweeps is accomplished.

In order to stop the sweep circuits at a desired channel, there are provided a keyboard 81, a register 82, a counter 84, a comparator 83 and the gate 75. The outputs of the flip-flop 76 are countered by the counter 74 and the content of the counter 74 is compared with that in the register 82 so that the coincidence signal may be derived from the comparator when the contents coincide with each other. In response to this coincidence signal, the gate 75 is turned off. When the contents do not coincide with each other, the non-coincidence signal is generated to turn on the gate 75. Therefore, the sweep operation is continued until a desired channel is selected, and then is stopped. Two pulses from the frequency detector which are generated immediately after the reset signal are erased by the blanking pulses whose leading edge coincides with that of the reset signal.

The system described hereinbefore is objectionable in that the operation is not stable because it takes a time before the first reference frequency is reached after the first sweep operation is started when the reference frequency for each channel has a higher degree of accuracy.

The system further has a defect that the adjustment is extremely difficult when the ratio of the variation in local frequency to the variation of voltage applied across the variable capacitance diode is greater especially as in the case of the UHF band because the difference between the first and second reference frequencies must be between the frequencies $f_1$ and $f_2$ when the oscillation frequencies of the local oscillators are set to the reference frequencies.

These defects or problems can be overcome by the present invention as will be described in more detail hereinafter.

Figure 14A:
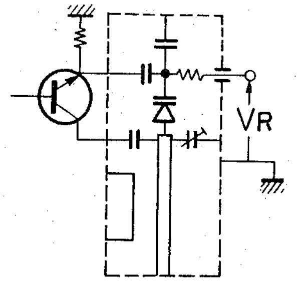
FIG. 14A is a circuit diagram of a prior art $\nu/4$ UHF local oscillator.
Figure 14B:
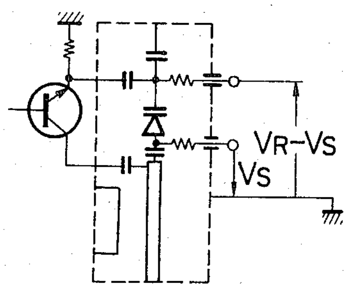
FIGS. 14B and 14C are circuit diagrams of the embodiments of the present invention.
Figure 14C:
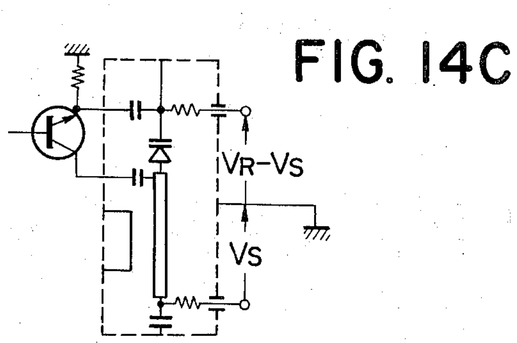
Figure 15A:
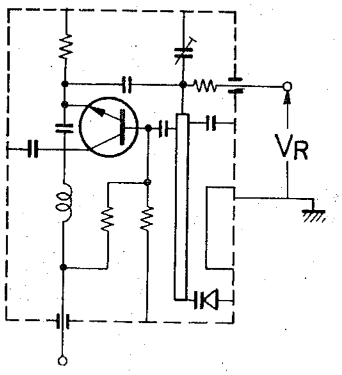
FIG. 15A is a circuit diagram of a $\nu/2$ UHF local oscillator in the prior art.
Figure 15B:
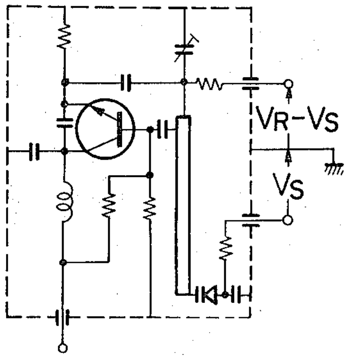
FIG. 15B is a circuit diagram of one embodiment of the present invention.

FIG. 13A shows the prior art VHF local oscillator, whereas FIG. 13B, an embodiment of the present invention. FIG. 14A shows the prior art $\nu/4$ UHF local oscillator whereas FIGS. 14B and 14C, the embodiments of the present invention. FIG. 15A shows the prior art $\nu/2$ UHF local oscillator, whereas the FIG. 15B, the embodiment of the present invention. In these local oscillators, the voltage is applied across a variable capacitance diode.

Figure 16:
FIG. 16 is a symbol for designating a variable capacitance diode.

The symbol shown in FIG. 16 is used to designate a variable capacitance diode. In the local oscillators in the prior art, the reverse voltage $V_R$ is applied to the cathode of the variable capacitance diode whose anode is at ground potential. However, according to the present invention, the ground potential is maintained at 0 volt and the reference voltage $V_s$ is applied to the anode, whereas the voltage $(V_R - V_s)$ is applied to the cathode.

Figure 10A:
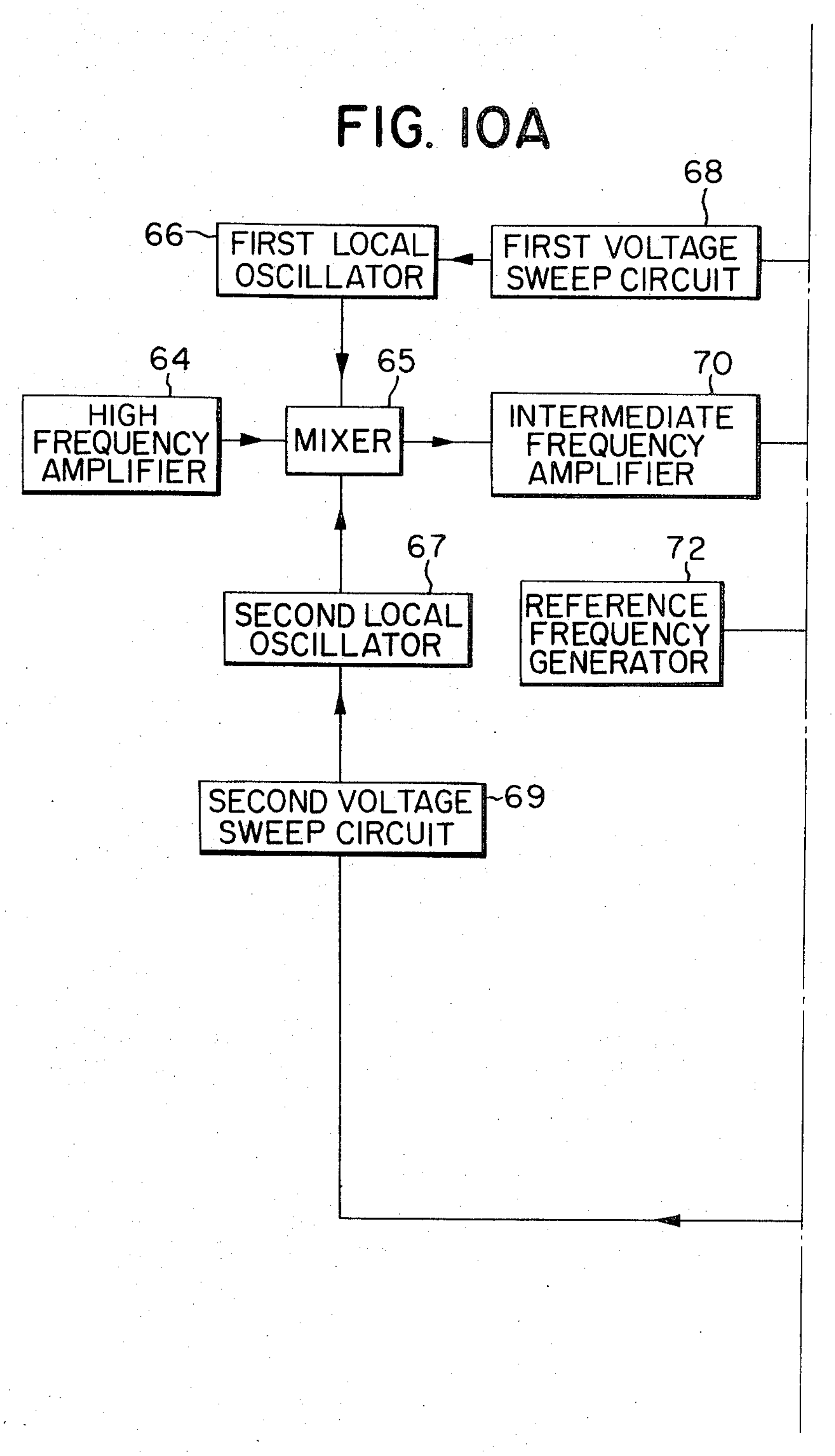
FIG. 10 is a block diagram of a frequency sweep device in accordance with the present invention.
Figure 17:
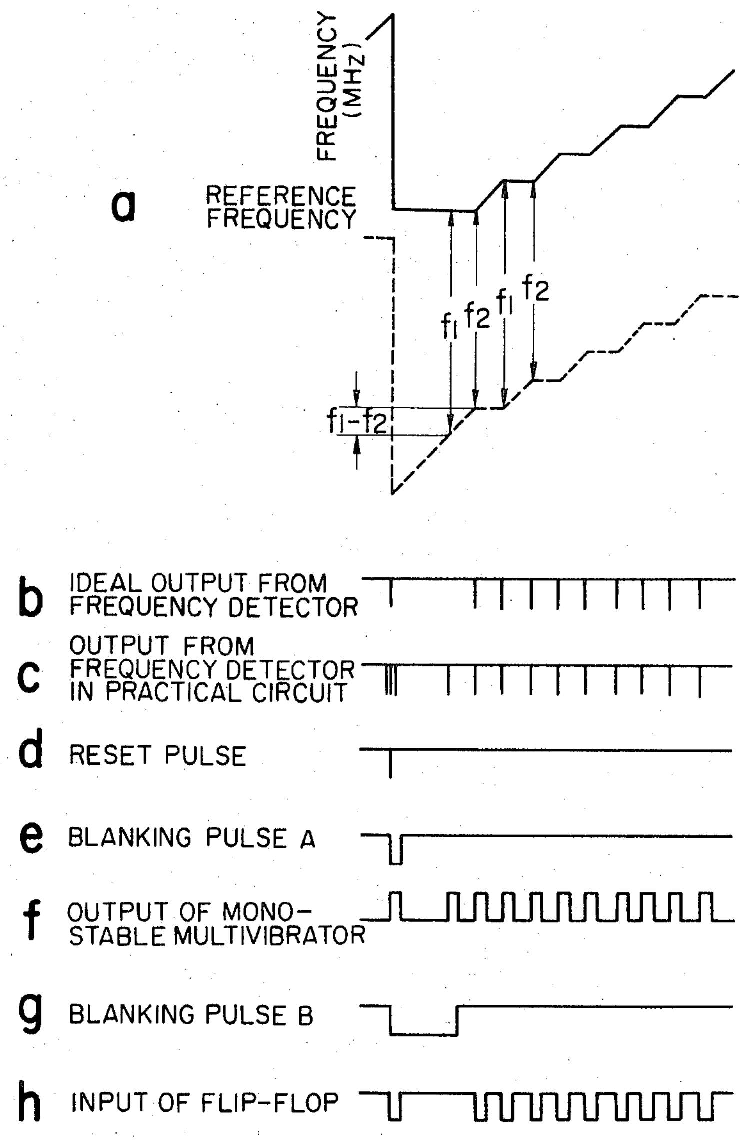
FIG. 17 is a graph used for the explanation of the mode of the frequency sweep operation by a first and second local oscillators.

When the embodiments shown in FIGS. 13A–15B are used as the first local oscillator shown in FIGS. 10A and B, the sweep operation as shown in FIG. 17 may be accomplished. When the voltage sweep circuits are reset to the lowest voltages, the reference voltage $V_s$ shown in FIGS. 13A–15B are applied to the variable capacitance diode in the first local oscillator so that the latter oscillates at the reference frequency. The second local oscillator starts the sweep from a frequency at which the voltage applied across the variable capacitance diode is zero. When the difference between the oscillation frequencies of the first and second local oscillators reaches $f_1$, the signal is derived from the frequency detector. If the flip-flop 76 is reversed in response to this signal, first local oscillator is activated, whereas the second local oscillator is de-activated to stop the sweep operation. As a result, the difference between the oscillation frequencies becomes greater than $f_1$, and is out of the bandwidth of the intermediate frequency amplifier. Furthermore, it becomes impossible to detect with $f_2$.

This embodiment of the present invention is characterized in that the first $f_1$ detection signal which is generated after the second sweep is started is prevented from being applied to the flip-flop 76 so as to prevent the reversal thereof, and the flip-flop 76 is reversed only when the frequency $f_2$ is detected next. According to the embodiment of the present invention, the output of the frequency detector may be derived at the next $f_1$, and the sweep operations of the first and second local oscillators are alternately reversed in the manner described with reference to FIG. 11. When the desired channel is selected, the sweep operation is stopped as described hereinbefore.

As shown in FIG. 17, the first $f_1$ generated after the second sweep is started may be erased before it reaches the flip-flop. The solid curves indicate the oscillation frequency of the first local oscillator, whereas the dotted curves, that of the second local oscillator. The pulse trains are also shown for explanation.

Figure 18:
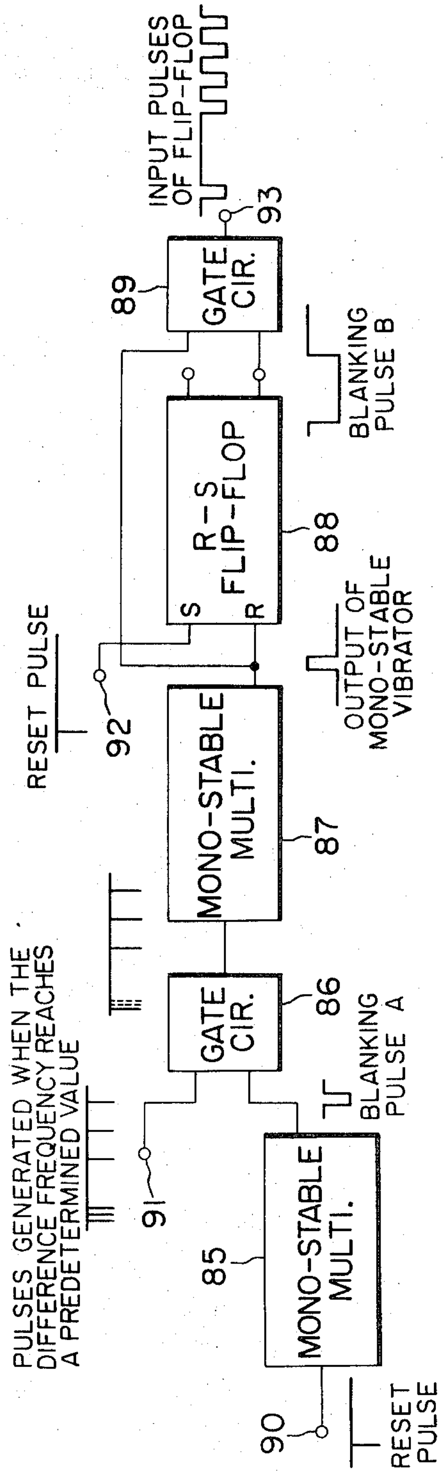
FIG. 18 is a circuit diagram of a pulse blanking circuit.

Whereas the ideal output pulse train shown in FIG. 17B is desired, the output pulse train as shown in FIG. 17C is derived from the frequency detection in practice. That is, the pulse train shown in FIG. 17C contains three extra pulses. Two pulses are generated when the voltage sweep circuits are reset after the first pulse corresponding to the reset pulse is generated, and the third pulse due $f_1$ is generated. In order to erase these extra pulses a circuit as shown in FIG. 18 is provided. Reference numeral 85 designates a monostable multivibrator; 86, a gate circuit; 87, a monostable multivibrator; 88, a R-S flip-flop; and 89, a gate circuit. The reset pulse is applied to a terminal 90, and a blanking pulse A is derived from the output terminal so that the two pulses which are generated when the voltage sweep circuits are reset and applied to a terminal 81 can be erased by the gate circuit 86. The other pulses are passed through the monostable multivibrator so that the pulse widths are slightly increased and the polarity is reversed. The trailing edges of the output pulses are applied to the R-terminal of the R-S flip-flop 88 whereas the reset pulse is applied to the S-terminal from a terminal 92. Then, there is generated a blanking pulse B whose leading edge coincides with that of the reset pulse and whose trailing edge coincides with that the first pulse of the monostable multivibrator except the reset pulse. The blanking pulse and the output from the monostable multivibrator 87 are applied to the gate circuit 89 so that the input to the flip-flop is derived from the terminal 93. The leading edge of the input pulse to the flip-flop coincides with that of the ideal output pulse shown by *b* in FIG. 17. Therefore, the sweep frequency waveforms of the first and second local oscillators as shown in FIG. 17 are obtained.

Figures 10B, 10C:
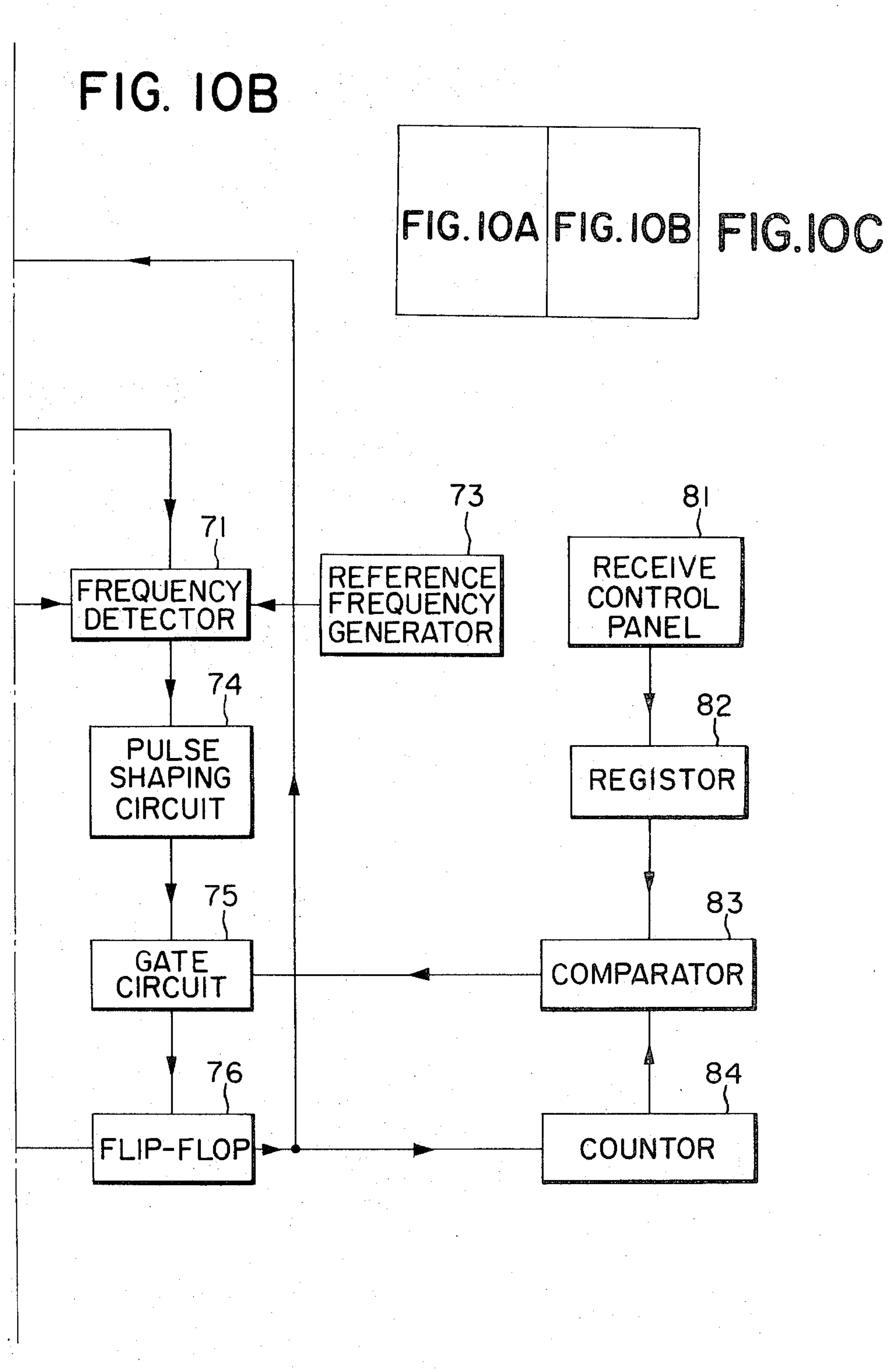
Figure 19:
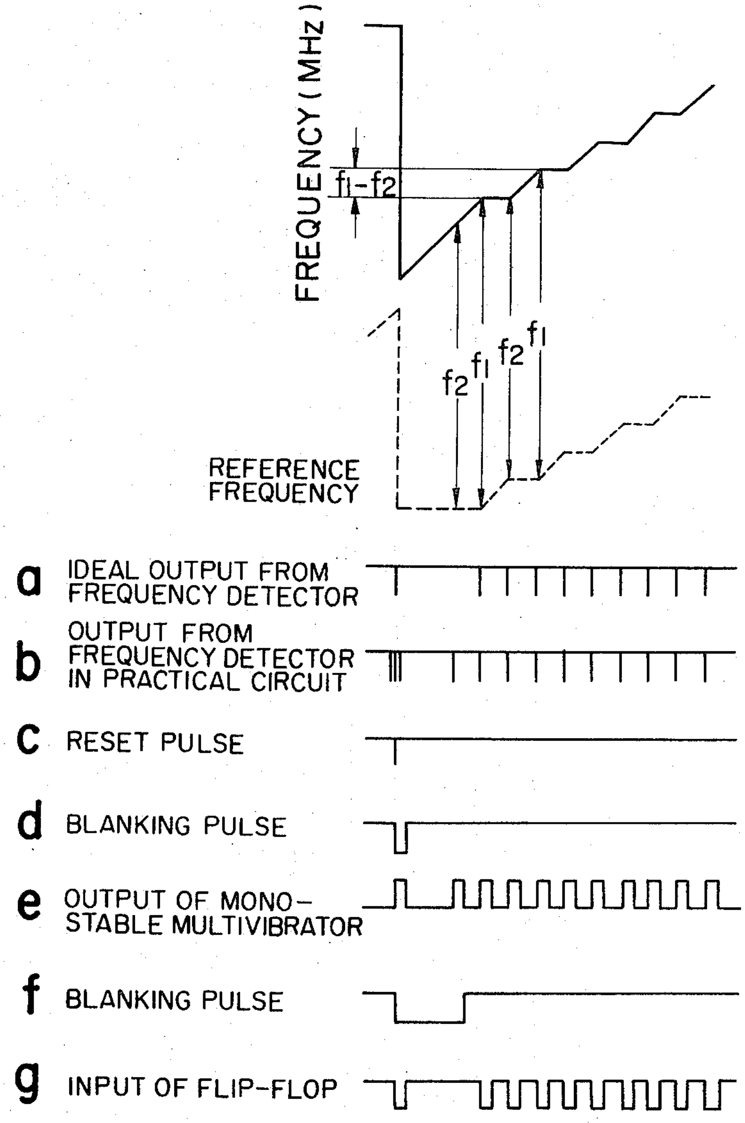
FIG. 19 is a graph used for the explanation of the mode of the frequency sweep operation by a first and second local oscillators.

FIG. 19 illustrates the oscillation frequencies of the first and second local oscillators and pulse waveforms when the local oscillators shown in FIGS. 13A–15B are used as the second local oscillator in FIGS. 10A and 10B. The mode of operation and effects are similar to those illustrated in FIG. 17 except that the oscillation frequency of the second oscillator is used as the reference frequency.

According to the embodiment of the present invention, the outputs of the frequency detector which are generated immediately after the sweep operation is started can be erased or eliminated, and the oscillation frequency of one of the local oscillators which can be alternately reversed in operation is used to determine the reference frequency so that the determination of the reference frequency can be made easily. Otherwise, the oscillation frequency of the other local oscillator must be set to the reference frequency between the frequencies $f_1$ and $f_2$ so that the adjustment especially for the UHF television band becomes difficult when the ratio of the variation in the local oscillation frequency to the variation in voltage applied across the variable capacitance diode.

According to the present invention, the trailing edge of the pulse generated from the monostable multivibrator which is activated in response to the output pulse of the frequency detector which is first generated after one of the local oscillators is activated, is the trailing edge of the blnking pulse so that unlike the case in which the width of the blanking pulse is dependent upon the time constant of the monostable multivibrator, the blanking pulse is not affected by the temperature and voltage. As a result, the reliable operation can be ensured.

Figure 20A:
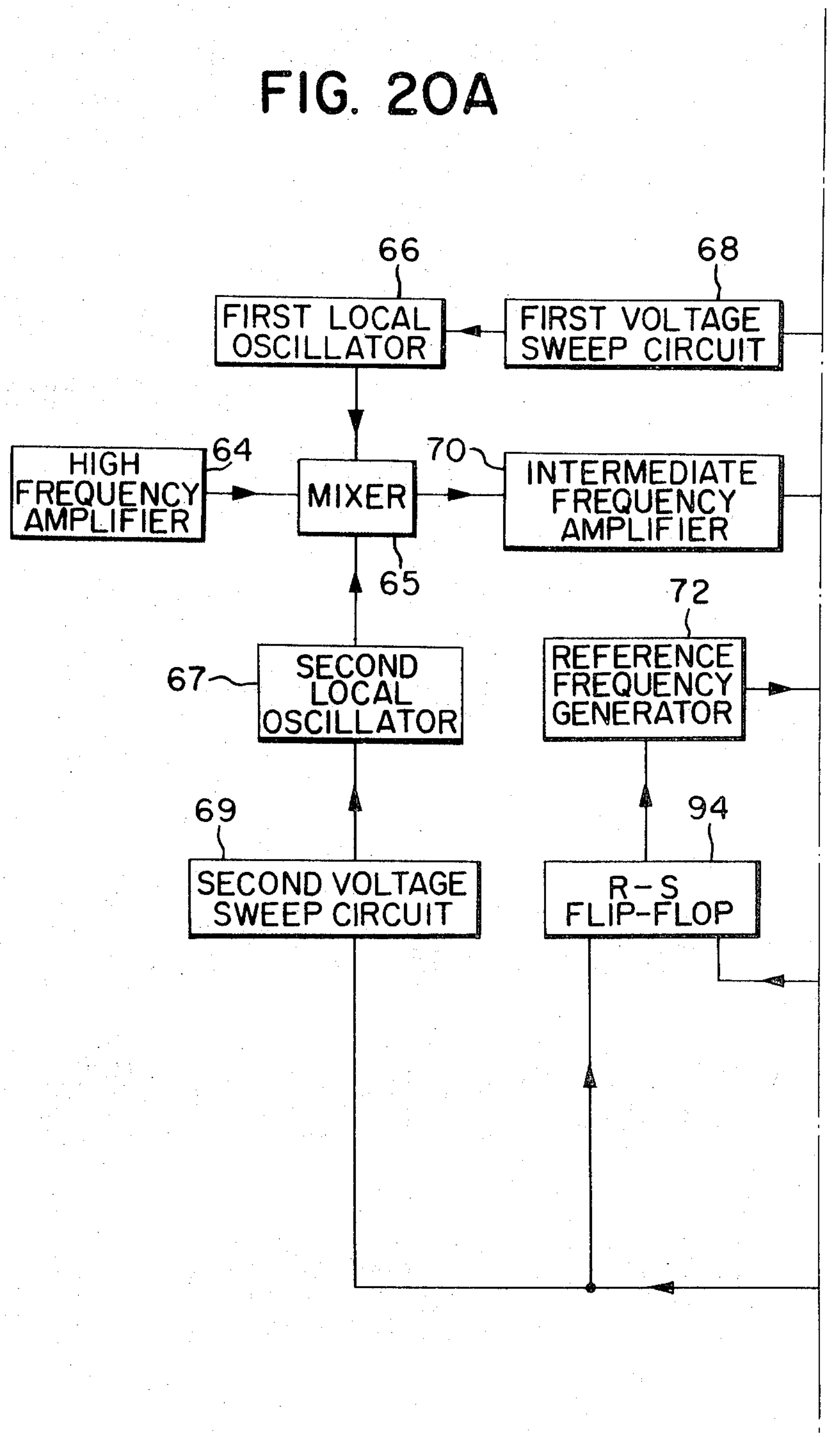
FIG. 20 is a block diagram of a further embodiment of the present invention.
Figures 20B, 20C:
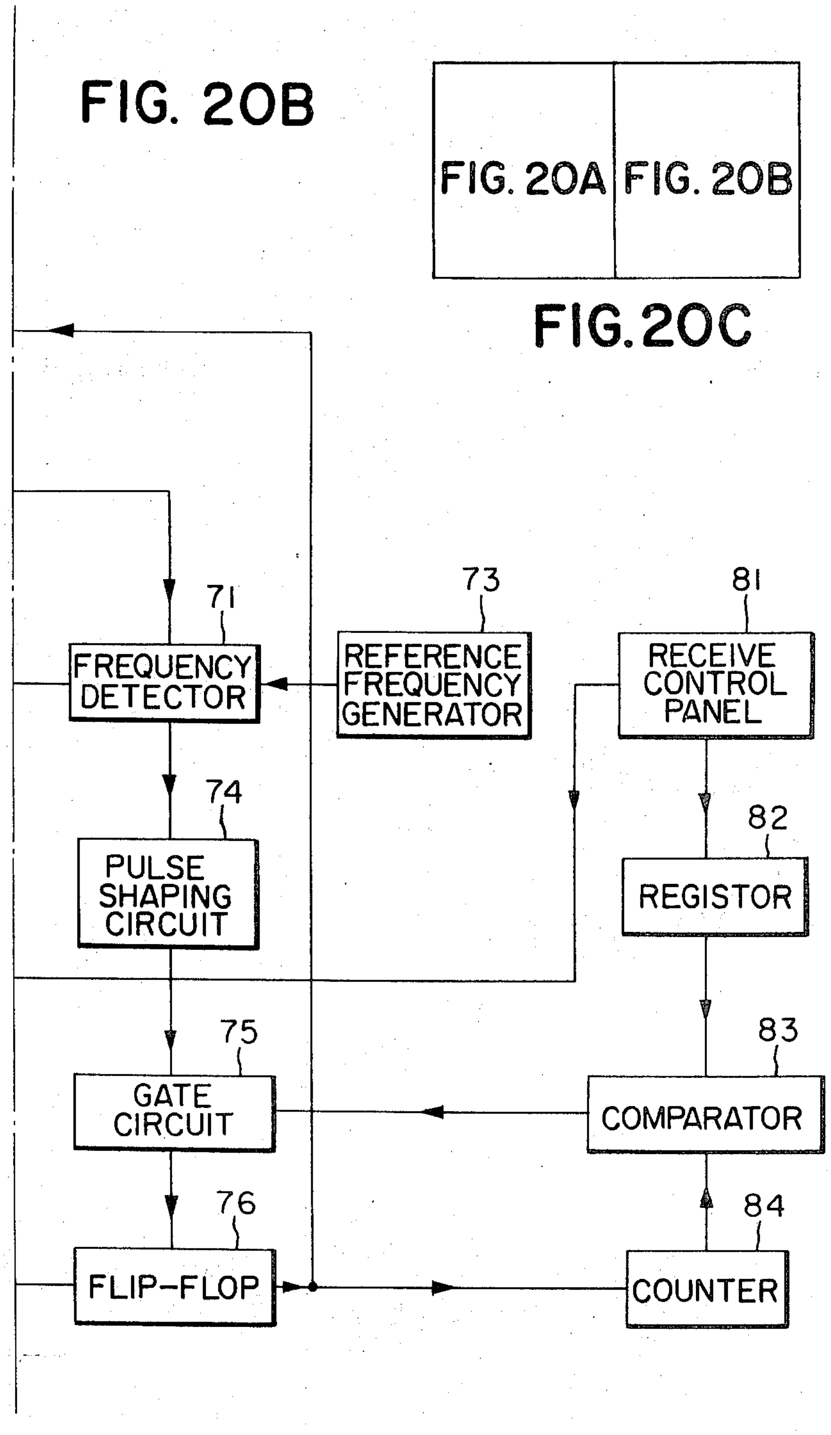

As shown in FIG. 20, a R-S flip-flop 94 and its inputs R and S are used to prevent the first signal from being generated in response to the detection of the frequency $f_1$ after the sweep operation is started. That is, the phase detector is used as the frequency detector 71, and the signal generators capable of generating the frequencies $f_1$ and $f_2$ respectively are used as the reference frequency generators 72 and 73. The reference frequency generator is controlled, that is it is activated and de-activated in response to the output of the R-S flip-flop 94 whose leading edge corresponds to the reset signal from the keyboard 91 and whose trailing edge corresponds to the signal from the flip-flop 76, the first $f_1$ will not be generated. Since $f_2$ is not controlled at all, the signal may be derived when the difference between the oscillation frequencies of the first and second local oscillators reaches the frequency $f_2$. In this case the output of the $f_2$ detector becomes the frequency detection signal which is first generated after the second sweep operation is started so that the sweep operations by the first and second local oscillators are alternately activated and de-activated as described hereinbefore with reference to FIG. 10. In FIG. 20, parts other than R-S flip-flop 94 are similar to those shown in FIG. 10 in construction and operation.

The same effects to those described with reference to FIG. 17B can be attained when the local oscillation shown in FIGS. 13A–15B are used as the second local oscillator.

According to the present invention, the oscillation of the frequency $f_1$ is controlled in response to the output of the R-S flip-flop 94 whose leading edge corresponds to in time to the reset pulse and whose trailing edge corresponds to the output of the flip-flop 76 which is generated when the frequency $f_2$ is obtained so that the pulse width can be stabilized and is not adversely affected by the temperature and voltage variation, opposed to the case in which the oscillation is controlled in response to the output of the monostable multivibrator. Thus, the generation of the frequency $f_1$ can be positively prevented. Consequently, one of the two local oscillators which are alternately activated and deactivated in sweep operation is used for setting the reference frequency so that the determination of the reference frequency becomes simple.

In general, the reference frequency of the sweep generator must be determined with a higher degree of accuracy. So far many attempts have been tried to attain this object, but no satisfactory solution has been proposed. Furthermore, the circuit which is capable of generating an accurate reference frequency is complicated in construction. The next embodiment of the present invention to be described with reference to FIGS. 21A and 21B can overcome these problems.

Figure 21A:
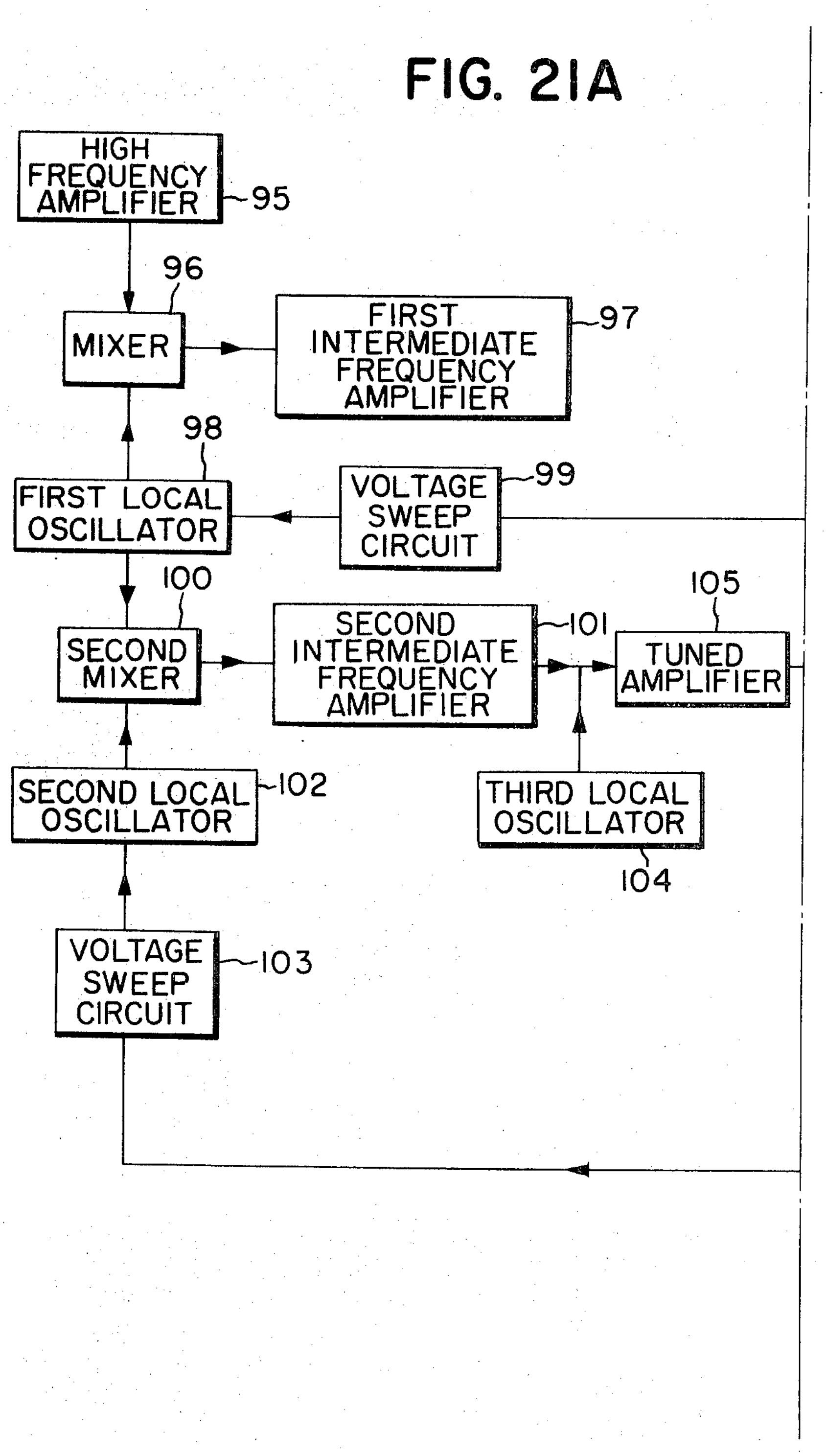
FIG. 21 is a block diagram of a still further embodiment of the present invention.
Figures 21B, 21C:
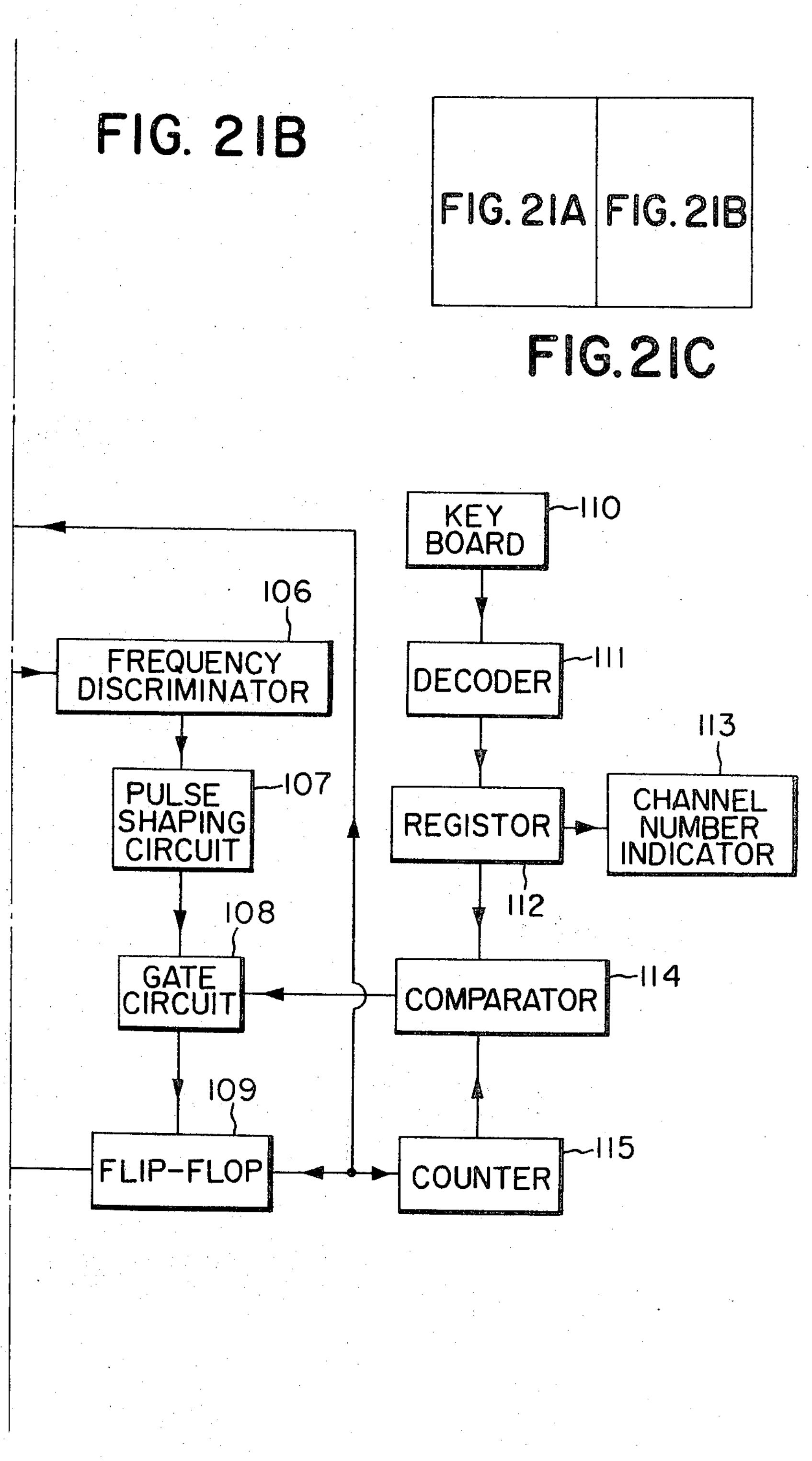

Referring to FIGS. 21A and 21B, reference numeral 95 designates a high frequency amplifier; 96, a mixer; 97, a first intermediate frequency amplifier; 98, a first local oscillator; 99, a voltage sweep circuit for a voltage-controlled variable-reactance element in the first local oscillator; 100, a second mixer; 101, a second intermediate frequency amplifier; 102, a second local oscillator; 103, a voltage sweep circuit for a voltage-controlled variable-reactance element in the second local oscillator 103; 104, a third local oscillator for generating a second intermediate frequency; 105, a tuned amplifier; 106, a frequency discriminator; 107, a pulse shaping circuit comprising for example a monostable multivibrator; 108, a gate circuit; 109, a flip-flop; 110, a keyboard; 111, a decoder; 112, a memory; 114, a comparator; 115, a counter; and 113 a channel number indicator.

Figure 22:
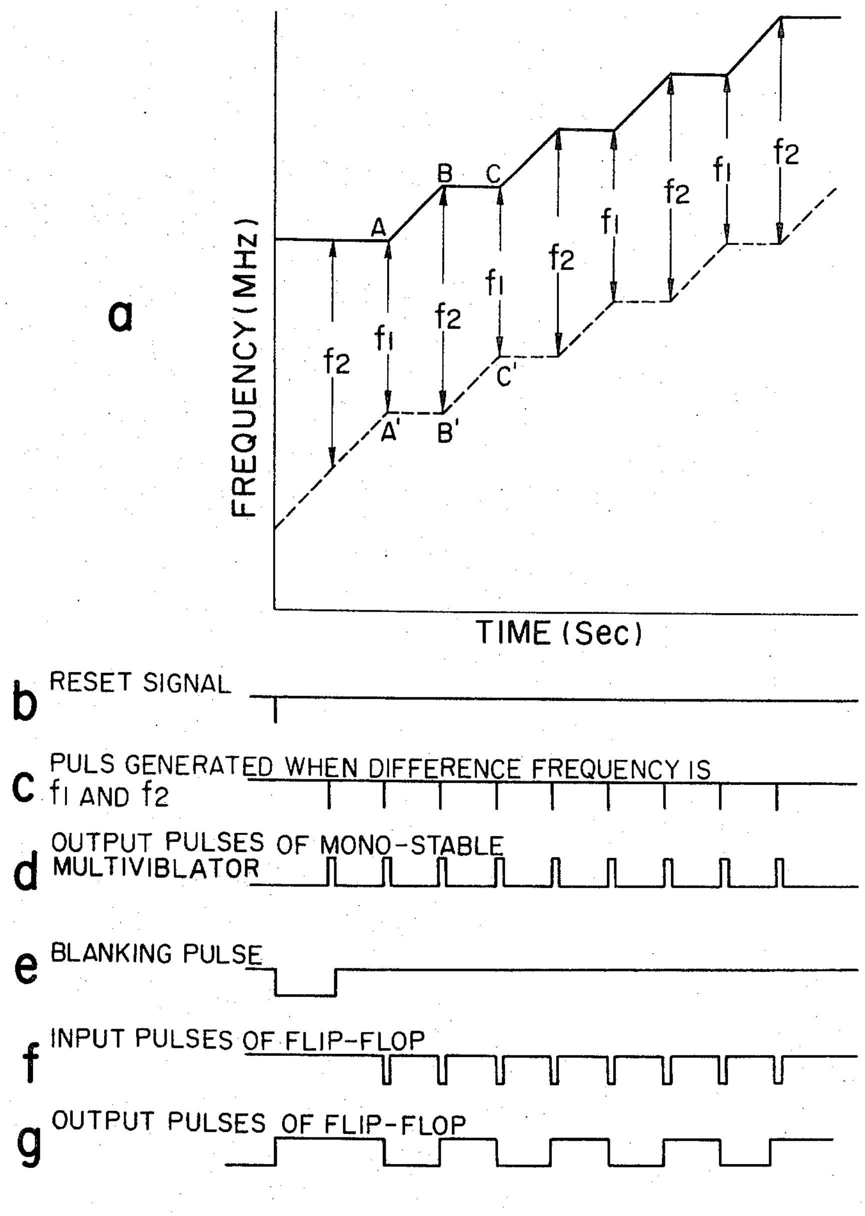
FIG. 22 illustrates a graph and various waveforms used for explanation of the mode of the frequency sweep operation thereof.

It is assumed that the oscillation frequency of the third local oscillator 104 be $f_e$ whereas the tuned frequency of the tuned amplifier 105 be $f_o$. Then the outputs are derived from the tuned amplifier 105 when the second intermediate frequency is $(f_e - f_o)$ and $(f_e + f_o)$ which are the reference frequencies $f_1$ and $f_2$. The mode of frequency sweep operations by the first and second local oscillators 98 and 102 is illustrated by *a* in FIG. 22, in which the solid curves illustrate the oscillation frequency of the first local oscillator whereas the dotted curves, the oscillation frequency of the second local oscillator 102. It is assumed that the operation be started when the sweep by the first local oscillator is deactivated whereas the second local oscillator is activated. The signal for starting the operation, that is the reset signal is shown by *b* in FIG. 22. When the difference between the oscillation frequencies of the first and second local oscillators 98 and 102 reaches the frequency $f_2$, the output of the tuned amplifier 105 which amplifies the signal of frequency $f_o$ is applied to the frequency discriminator 106 which in turn gives the signal representative of the discrimination of the frequency $f_o$. That is, the output frequency of the second intermediate amplifier 104 is detected as $f_2$. When the pulse representative of the detection of the frequency $f_2$ is applied to the monostable multivibrator 114 shown in FIG. 23 so that the output shown by *d* in FIG. 22 may be obtained. The output is applied to the R-terminal of the R-S flip-flop 115 shown in FIG. 23 whereas the reset pulse is applied to the S-terminal so that the blanking pulse as shown by *e* in FIG. 22 may be derived and applied to the gate circuit 116 shown in FIG. 23. The output of the monostable multivibrator 114 is applied to the other terminal of the gate circuit 116 so that the signal representative of the detection of the frequency $f_2$ may be erased or eliminated. Thus, no input is applied to the flip-flop 109. When the difference between the oscillation frequencies of the first and second local oscillators reaches the frequency $f_1$ as the local oscillation frequency of the second local oscillator increases, the pulse representative of the detection of the frequency $f_1$ is derived from the frequency discriminator 106. In this case, the R-S flip-flop 115 is disabled so that the output is applied to the flip-flop 109 through the gate circuit 108. The pulse shaping circuit 107 and the gate circuit 108 shown in FIG. 21 correspond to the monostable multivibrator 114 and the gate circuit 116 shown in FIG. 23. Therefore the flip-flop circuit 109 is reversed and its output reverses the first and second voltage sweep circuits 99 and 103, whereby the frequency sweep operation is also reversed. That is, the first local oscillator starts to sweep whereas the second local oscillator is de-activated to stop the sweep as shown at the points A and A′ in FIG. 22. When the oscillation frequency of the first local oscillator reaches the point B whereas the oscillation frequency of the second local oscillator 102 reaches the point B′, the difference becomes $f_2$. The frequency discriminator 106 detects the output of frequency $f_2$ of the second intermediate frequency amplifier and the output of the discriminator is applied to the flip-flop 109 through the pulse shaping circuit 107 and the gate circuit 108. As a result, the sweep operations of the first and second local oscillators are reversed at the points B and B′ in FIG. 22. FIGS. 22*c*, *d*, *f* and *g* illustrate the waveforms of the pulses representative of the detection of the frequencies $f_1$ and $f_2$, of the output of the monostable multivibrator, the input signal to the flip-flop and the output signal of the flip-flop. The first and second local oscillators 98 and 102 are reversed in operation at the points B and B′, the points C and C′ and so on as indicate by *a* in FIG. 22. If the difference between the frequencies $f_1$ and $f_2$ is made equal to the channel width frequency, the difference between the oscillation frequencies at the points A and B equals the channel width frequency. When the oscillation frequency of the first local oscillator is precisely keyed up to the point A, the time interval for each channel at which the sweep by the first local oscillator is de-activated is obtained from the point B. The frequency of this interval is determined as the reference frequency for each channel. In order to count and indicate the channel numbers, the outputs of the flip-flop 109 are applied to the counter 115. In order to stop the sweep operation when a desired channel is selected and to indicate this selected channel number, the following method is used. A desired channel number is set on the keyboard 110 whose output is fed into the memory 112 through the decoder 111, and the comparator 114 generates the coincidence signal when the content in the memory 112 coincides with the content in the counter 115. If the contents do not coincide with each other, the comparator 114 generates the non-concidence signal. These coincidence and non-coincidence signals are applied to the gate circuit 108. When the coincidence signal is applied, the gate circuit 108 is turned on whereas when the non-coincidence signal is applied, the gate is turned off. As a result, when the sweep frequency reaches the frequency of the desired channel set on the keyboard 110, the flip-flop 109 is de-activated, whereby the sweep operation is also stopped. The channel indicator 113 indicates the content in the register 112. It is possible to make the difference between the frequencies $f_1$ and $f_2$ $1/n$ of the channel width frequency, for example one half. In this case, the difference between the oscillation frequencies at the points A and B becomes one half of the channel width frequency. Between the flip-flop 109 and the counter 115 is inserted a flip-flop capable of dividing the frequency into half as described hereinbefore.

Figure 24A:
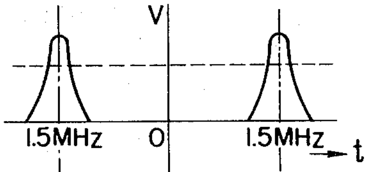
FIGS. 24A, 24B, 25A and 25B are graphs used for explanation of the mode of operation thereof.
Figure 24B:
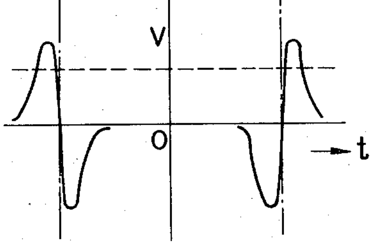

FIGS. 24A and 24B illustrate the outputs of the tuned amplifier 105 and the frequency discriminator 106 in case of the second intermediate frequency sweep operation. When it is permitted to detect the output of 1.5 MHz of the tuned amplifier 105 with a lesser degree of accuracy, it may be detected from the output of the tuned amplifier 105 as shown in FIG. 24A, but when the accuracy is essential, the frequency discriminator is uses as shown in FIG. 24B.

Figure 25A:
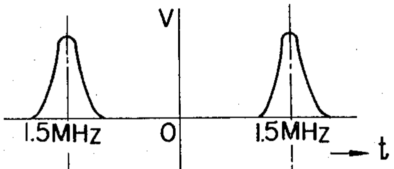
Figure 25B:
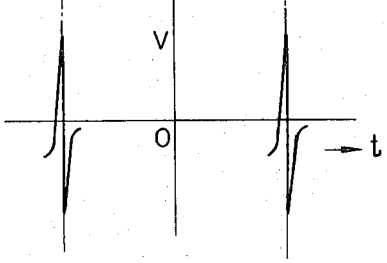

FIGS. 25A and 25B illustrate the outputs when the piezo-resonator such as a crystal resonator is used as a frequency discriminator 106. In this case, the frequency can be detected with a higher degree of accuracy as compared with the frequency discriminator 106 employing an LC circuit whose characteristics are shown in FIGS. 24A and 24B.

Referring back to FIGS. 24A and 24B, it is assumed that the frequency is detected at a level indicated by the dotted lines. Then, as shown in FIG. 24B, the frequency discriminator 106 must detect on the S-shaped curves. When in detection of the first frequency $f_2$ the output of the frequency discriminator 106 is detected on the left curve in FIG. 24B, the error signal is generated because the rising skirt or slope intersects the dotted line. As described hereinbefore, the pulse representative of the detection of the first frequency $f_2$ is eliminated by the blanking signal and is not applied to the flip-flop 109. As a result, the first signal applied to the flip-flop 109 is the output of the frequency discriminator 106 which is shown on the right in FIG. 24B. In response to this signal, the flip-flop 109 is actuated, and thereafter, the frequency is detected on the inner side of the S-shaped curve to reverse the flip-flop 109. Therefore, the frequency can be relatively accurately detected even by the frequency discriminator using an LC circuit.

According to the embodiment of the present invention the reference frequencies $f_1$ and $f_2$ are not detected as the second intermediate frequencies and the third local oscillator 104 is utilized to detect if the difference between the reference frequencies $f_1$ and $f_2$ reaches a predetermined frequency, and if so, the first and second local oscillators 98 and 102 are reversed in sweep operation. Therefore, the accuracy in detection of the frequencies $f_1$ and $f_2$ is improved as compared with the system in which the frequencies $f_1$ and $f_2$ are directly detected. Assume that the ratio of the center frequency $f_o$ of the frequency discriminator 106 to the output bandwidth $f_w$ of the frequency discriminator 106 be equal in the second intermediate frequency and the frequency difference. Then, the accuracy in detection can be improved by the ratio of the frequency $f_1$ or $f_2$ to the center frequency $f_o$.

As is clear from the foregoing description, the two reference frequencies can be detected at a higher degree of accuracy.

Figure 26A:
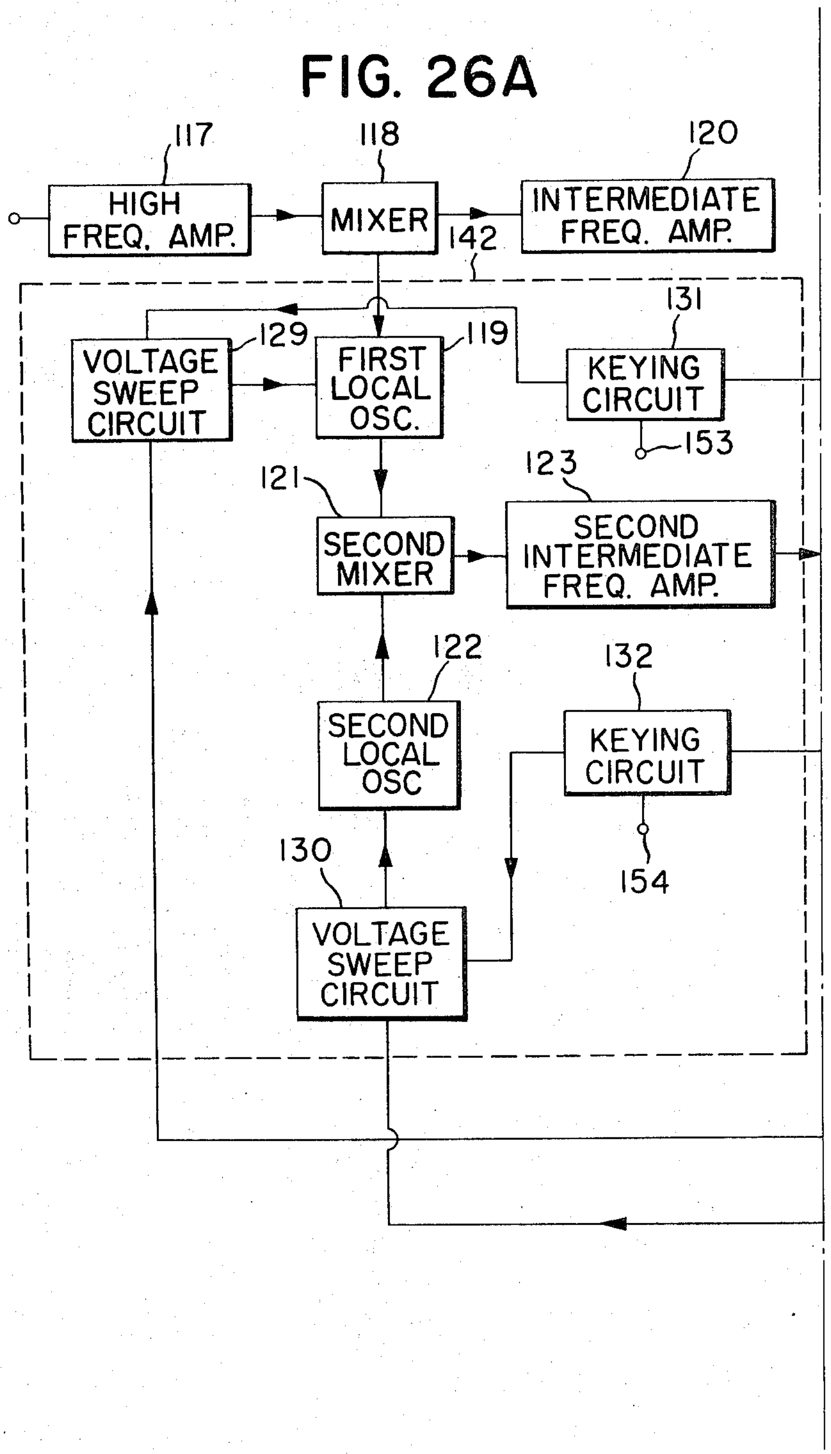
FIG. 26 is a block diagram of a yet another embodiment of the present invention.
Figure 26B:
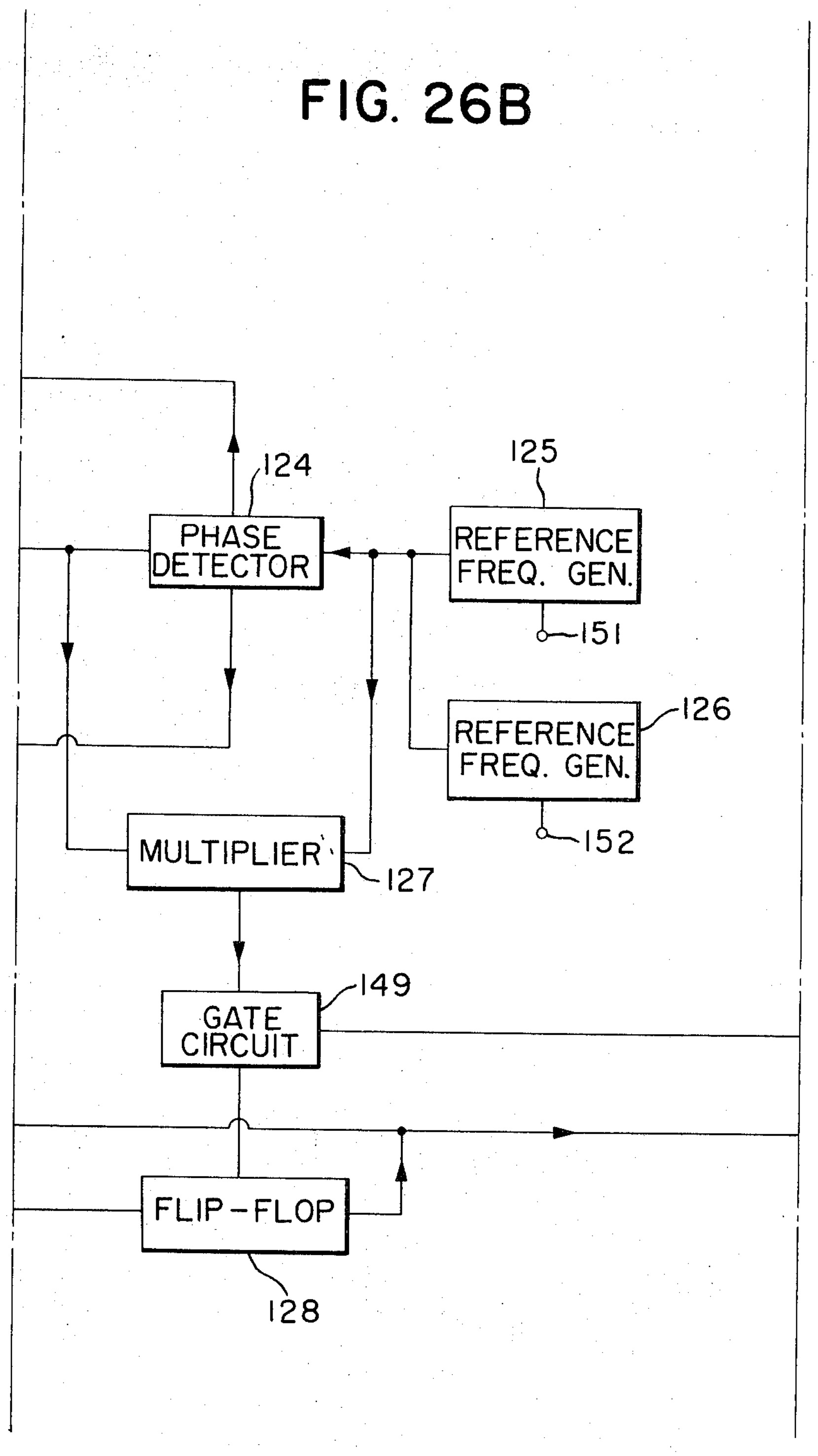
Figures 26C, 26D:
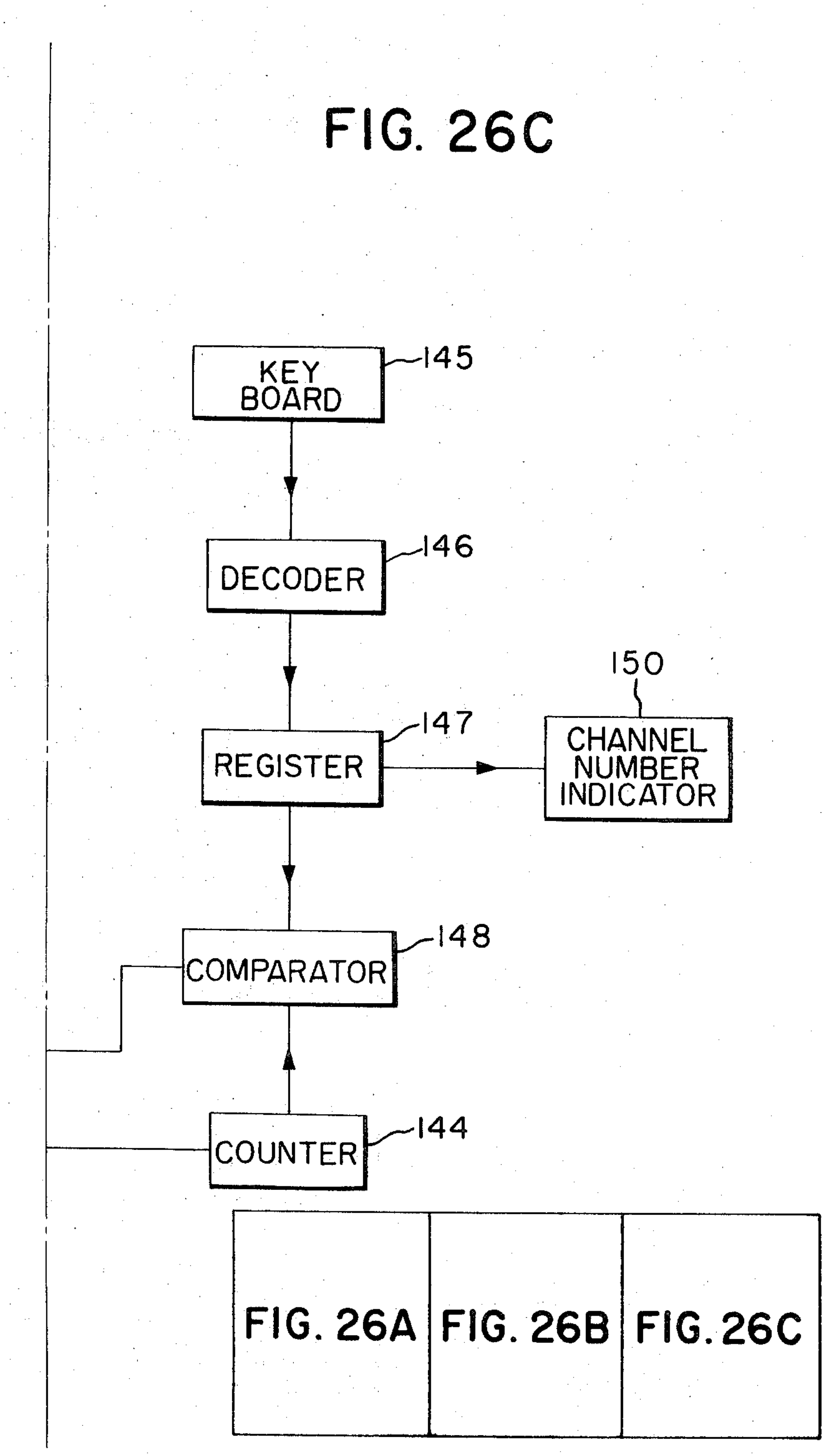

Referring to FIG. 26, reference numeral 117 designates a high frequency amplifier; 118, a mixer; 119, a first local oscillator; 120, an intermediate frequency amplifier; 121, a second mixer; 122, a second local oscillator; 123, a second intermediate frequency amplifier; 124, a phase detector; 125 and 126, reference frequency generators for the phase detector 124; 127, a multiplier circuit actuable in response to the outputs of the second intermediate frequency amplifier 123 and the reference frequency generator 125 or 126; 128, a flip-flop circuit actuable in response to the output of the multiplier circuit 127; 129 and 130, voltage sweep circuits actuable in response to the outputs of the flip-flop circuit 128; 131, a keying circuits for keying a phase block loop comprising 121, 123, 124, 131 and 129; and 132, a keying circuit for keying a phase lock loop comprising 122, 121, 123, 124, 132 and 130.

Figures 23, 27:
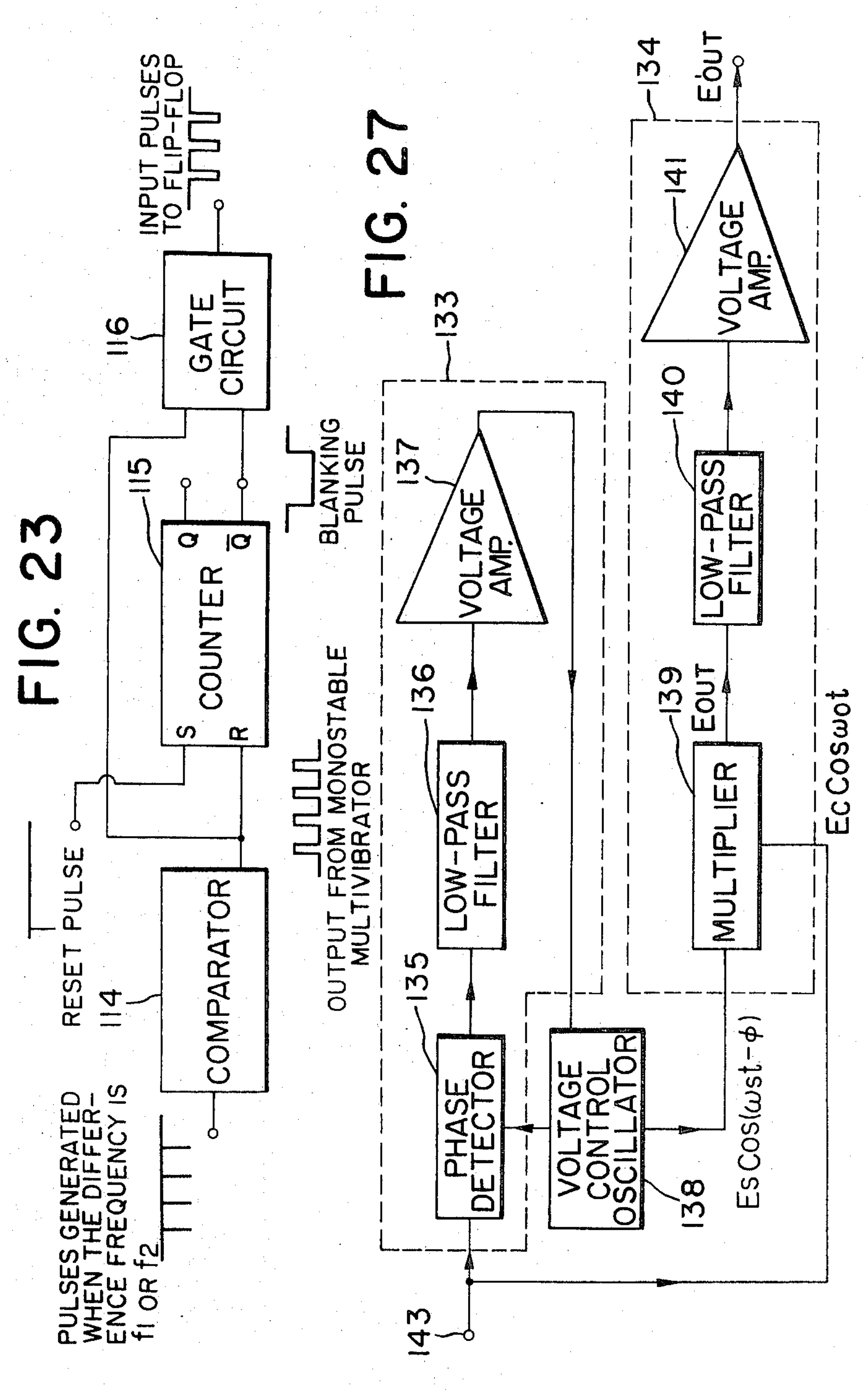
FIG. 23 is a block diagram of one portion thereof.
FIG. 27 is a block diagram of one portion thereof for detailed description.

FIG. 27 illustrates in detail the constructions of the phase detector 124 and the multiplier circuit 127 shown in FIG. 26, and is used for explanation of the phase lock loops and a circuit for detecting whether phase lock loop is keyed or not. The elements encircled by the dotted lines 133 and 134 correspond to the phase detector 124 and the multiplier circuit 127 shown in FIG. 27. Reference numeral 135 designates a phase detector; 136, a low-pass filter; 137, a voltage amplifier; 138, a voltage-controlled oscillator which corresponds to the circuit encircled by the dotted lines 142 in FIG. 26; 139, a multiplier; 140, a low-pass filter; and 141, a voltage amplifier.

The elements 135, 136, 137 and 138 constitute the phase lock loop. The output of the reference frequency generator is applied to a terminal 143. To the multiplier is applied the output of the reference frequency generator $$E_c \cos\omega_c t$$

where $E_c$: maximum amplitude of the reference frequency $\omega_c$: angular frequency of the reference frequency and the output of the voltage controlled oscillator 138

$$E_s \cos(\omega_s t - \phi).$$

Figure 28A:
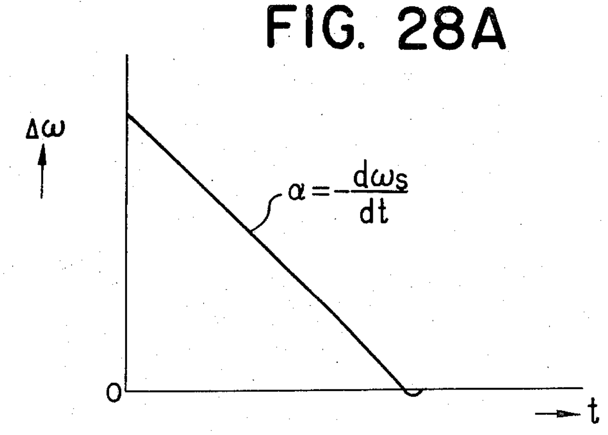
FIGS. 28A–28C are characteristic curves used for explanation of the mode of the frequency sweep operation thereof.
Figure 28B:
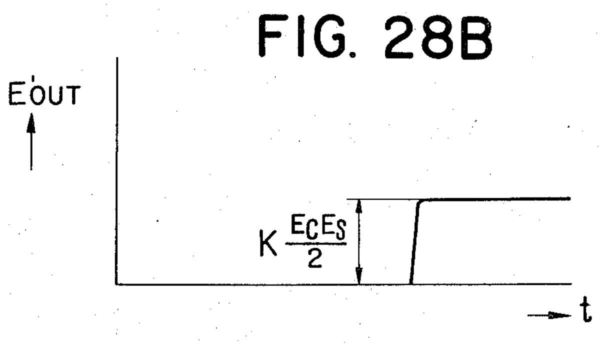

The output $E_{out}$ of the multiplier 39 is the product of these two outputs, that is $E_{out} = E_c \cos\omega_c t \times E_s \cos(\omega_s t - \phi)$ $= (E_c E_s/2)\ [\cos\{(\omega_c + \omega_s)t - \phi\}$ $+ \cos\{(\omega_c - \omega_s)t + \phi\}]$ where $E_s$: maximum amplitude of the output of the voltage control oscillator $\omega_s$: angular frequency of the output of the voltage control oscillator The output $E_{out}$ is made to pass through the low-pass filter 140 and the voltage amplifier 141, whose output $E_{out}'$ is given by $E_{out}' = (KE_c E_s/2)\cos\{(\omega_c - \omega_s)t + \phi\}$ $= (K_c E_c E_s/2)\cos(\Delta\omega t + \phi)$ The theory of the phase lock loop teaches that when the loop consisting of the elements 135, 136, 137 and 138 is locked, $\Delta\omega = 0$, and $\phi = 0$ Hence, $E'_{out} = KE_c E_s/2$ This is shown in FIGS. 28A and 28B. That is, FIG. 28A shows that the difference $\Delta\omega$ between the reference frequency $\omega_c$ and the voltage-controlled oscillation frequency $\omega_s$ varies with time. The slope $\alpha$ is given by $\alpha = d\omega_s/dt$ and in the steady state $\Delta\omega = 0$.

Figure 28C:
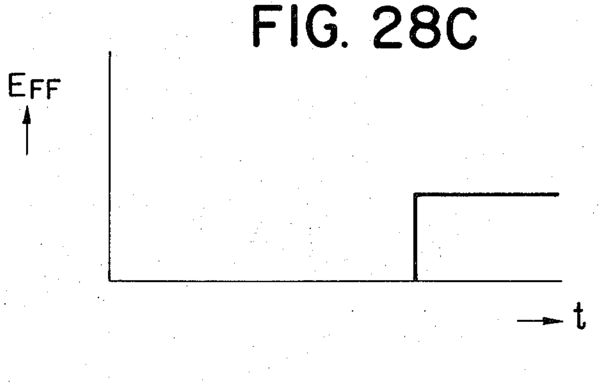

FIG. 28A also shows that in the transient state, the overshoot is very little. When in the steady state $\Delta\omega$ is zero, the output $E'_{out} = KE_c E_s/2$ is derived as shown in FIG. 28B after the transition state. This output corresponds to that of the multiplier circuit 127 shown in FIG. 27, and serves to actuate the flip-flop 128 whose output is shown in FIG. 28C.

Referring back to FIG. 26, the first and second local oscillators sweep the frequency with the reference frequencies $f_1$ and $f_2$ of the reference frequency generators 125. The mode of this frequency sweep operation is illustrated in FIG. 2 wherein the oscillation frequency of the first local oscillator 119 is indicated by the solid lines whereas the oscillation frequency of the second local oscillator 122, by the dotted lines. It is assumed that the function of the device is started when the first local oscillator 119 is de-activated whereas the second local oscillator is activated with the difference between the oscillation frequencies of the two local oscillators 119 and 122, being between the two reference frequencies $f_1$ and $f_2$. When the reference frequencies $f_1$ and $f_2$ are within the bandwidth of the first intermediate frequency amplifier and if the difference in oscillation frequency between the first and second local oscillators reaches the frequency $f_1$, the frequency $f_1$ of the second intermediate frequency output is detected by the frequency detector comprising the phase detector 124 and the multiplier circuit 127. The construction and mode of operation of this frequency detector have been described in detail with reference to FIG. 27. The output of the frequency detector is shaped by the pulse shaping circuit and is applied to the flip-flop 128 to reverse it. The output of the flip-flop 128 reverse the voltage sweep operation of the voltage sweep circuits so that the frequency sweep operation is also reversed. That is, the first local oscillator 119 starts to sweep whereas the sweep by the second local oscillator is deactivated. This reversal takes places at the points A and A' in FIG. 2. Next when the local oscillation frequency of the first local oscillator 119 reaches the point B whereas that of the second local oscillator reaches the point B', the difference frequency becomes $f_2$, which is detected by the frequency detector from the output of the second intermediate frequency. The output is shaped and applied to the flip-flop 128. In like manner, the frequency sweep operation is reversed between the first and second local oscillators 119 and 122 at the points B and B'. If the difference between the reference frequencies $f_1$ and $f_2$ is selected so as to be equal to the channel width frequency, the difference in frequency of the first local oscillator 119 between the point A and the interval between the points B and C becomes equal to the channel width frequency. When the oscillation frequency up to the point A is precisely determined, the interval at which the first local oscillator is deactivated to stop the sweep for each channel is obtained from the point B. The frequency in this interval is the reference frequency of each channel. In order to count and indicate the channel number, the output of the flip-flop 128 is applied to the counter.

In order to stop the frequency sweep when the desired channel number is selected and to indicate this selected channle number, the following method is employed. A desired channel number is set on a keyboard 145, whose output is fed into the register 147 through the decoder 146. When the content in the register 147 coincides with that in the counter 144, the comparator 148 generates the coincidence signal. When the contents do not coincide with each other, the comparator 148 generates the non-coincidence signal, which is applied to the gate 149 to turn it on. When the coincidence signal is applied to the gate 149, the latter is turned off. As a result, when the sweep frequency reaches the frequency of the desired channel number set on the keyboard 149, the flip-flop is stopped, whereby the frequency sweep operation is stopped. The content in the register 147 is indicated by the channel number indicator 150.

To the terminals 151 and 152 are applied the signals for actuating the flip-flop 128 which in turn alternately actuates the reference frequency generators 125 and 126. To the terminals 153 and 154 are applied the signals from the flip-flop 128 for alternately actuating the keying circuits 131 and 132.

Figure 29:
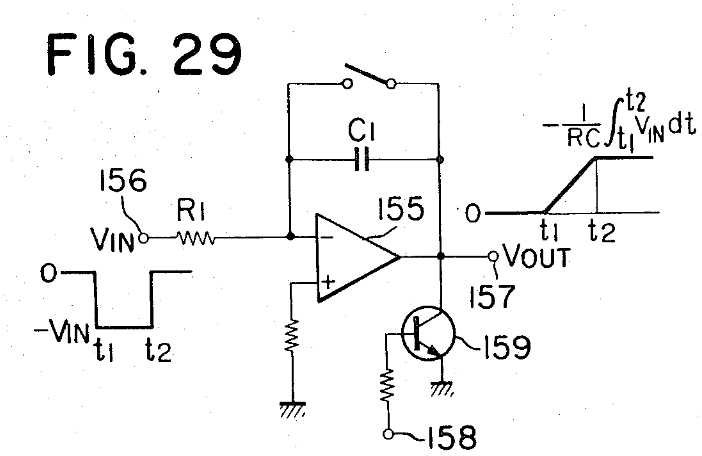
FIG. 29 is a circuit diagram of a voltage sweep circuit thereof.

To the voltage sweep circuits 129 and 130 are applied the outputs of the flip-flop 128 and the phase detector 124. One embodiment of the voltage sweep circuit is shown in FIG. 29. Reference numeral 155 designates an operational amplifier forming an integration circuit together with a resistor $R_1$ and a capacitor $C_1$. A voltage $V_{in}$ is applied to a terminal 156 whereas a voltage $V_{out}$ is derived from an output terminal 157. As is well known in the art, the voltage $V_{out}$ is given by $$V_{\text{out}}=-\frac{1}{R_1C_1}\int_{t_1}^{t_2}V_{\text{in}}\cdot dt$$

where $V_{in}$ the output from the flip-flop 12. To a terminal 158 is applied the output of the phase detector 124. The output terminal 157 is connected to the first and second local oscillators so that when the phase lock loop is closed, a current flows through the transistor 159 whereby the output voltage at the terminal 157 stops the sweep. The sweep is stopped by the phase lock voltage at the output terminal 157 faster than by the input voltage $V_{in}$ applied to the input terminal 156 because of the reason described with reference to FIGS. 27 and 28.

Figure 30A:
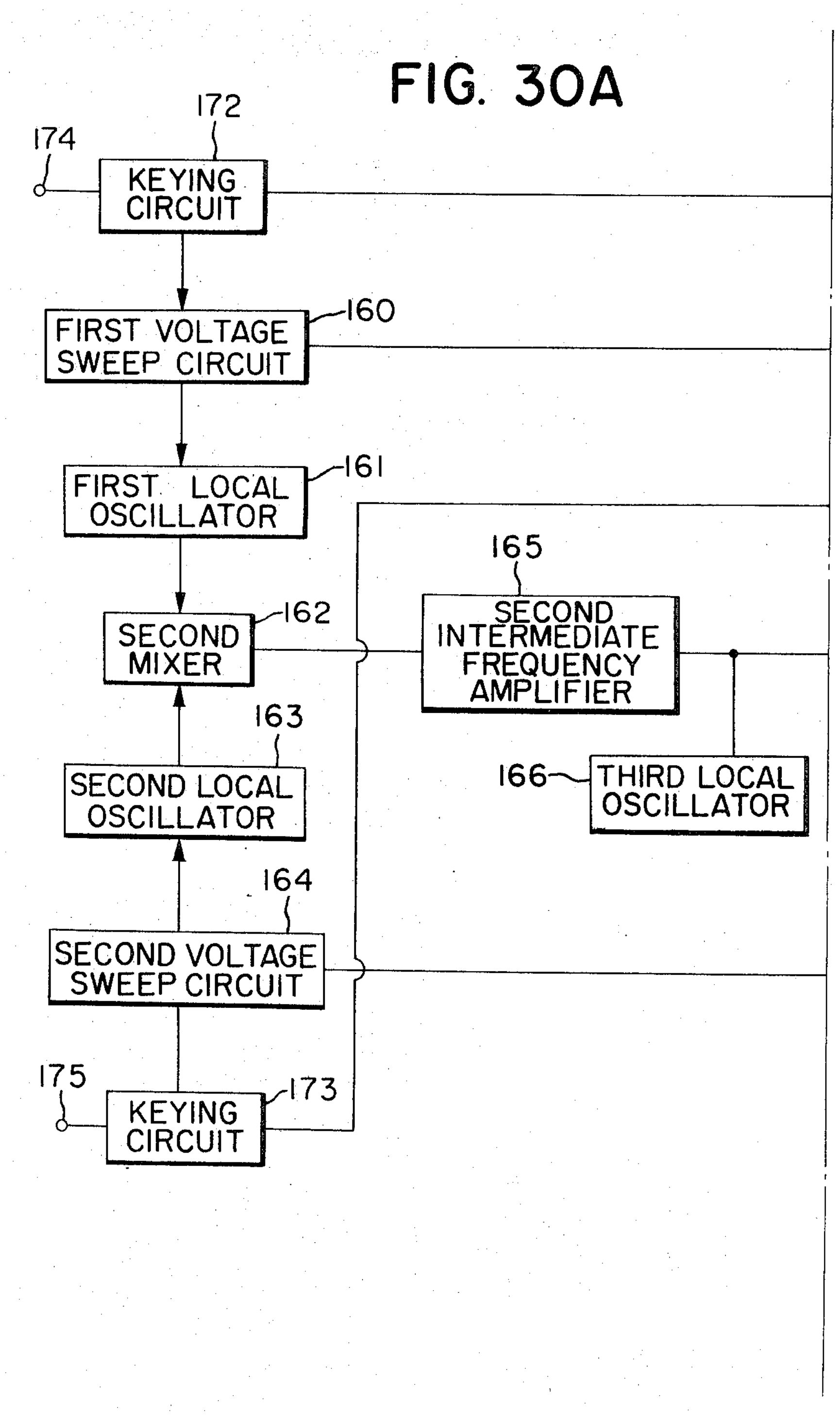
FIG. 30 is a block diagram of a still further embodiment of the present invention.
Figures 30B, 30C:
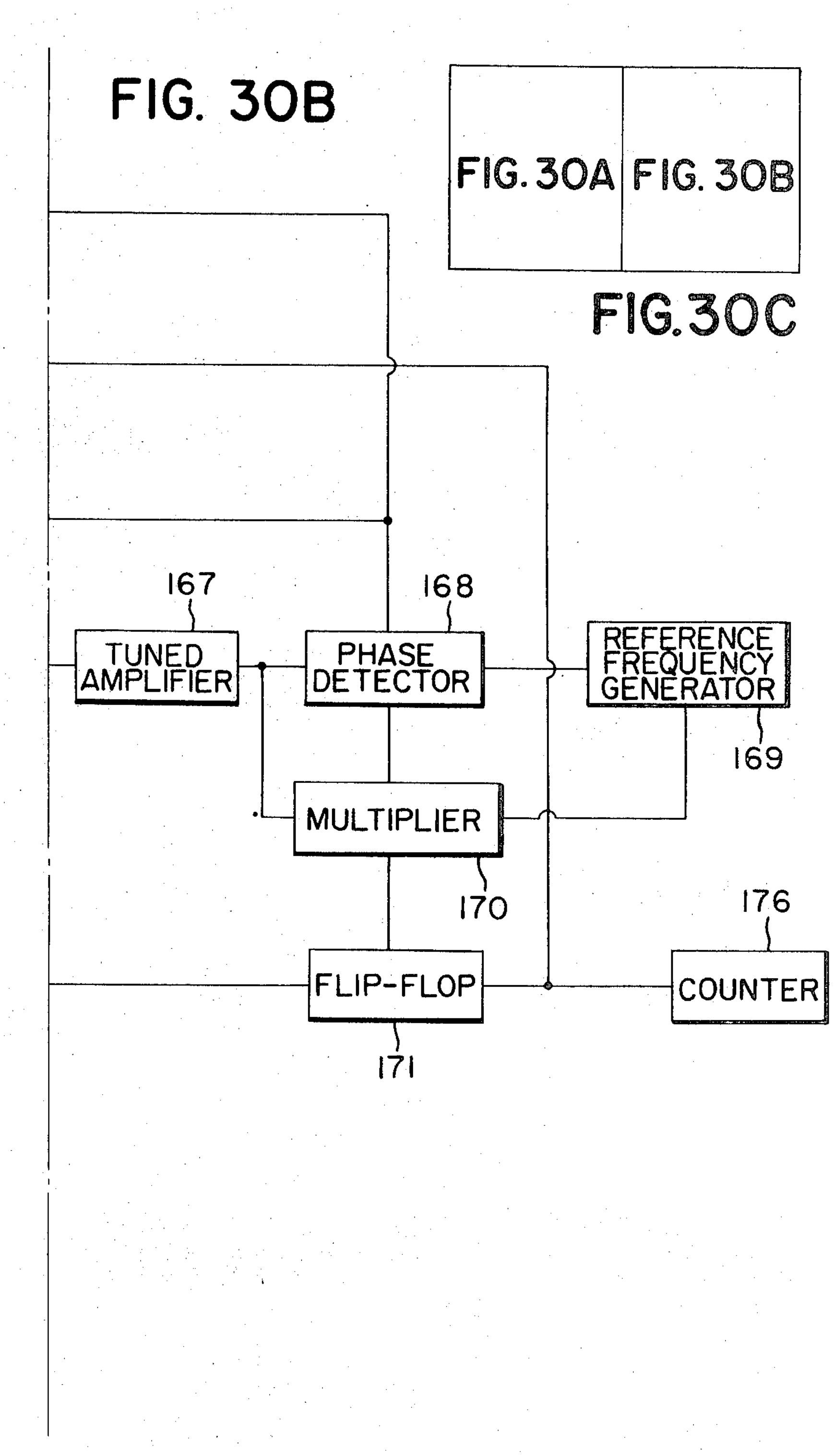

In the embodiment shown in FIG. 30, the operating frequency of the phase detector can be lowered and only one reference frequency generator is used. For the sake of simplifying the explanation, those different from the embodiment shown in FIG. 26 will be described. Reference numeral 160 designates a first voltage sweep circuit; 161, a first local oscillator; 162, a second mixer; 163, a second voltage sweep circuit; 165, a second intermediate frequency amplifier; 166, a third local oscillator for a second intermediate frequency; 167, a tuned amplifier; 165, a phase detector; 169, a reference frequency generator; 170, a multiplier; 171, a flip-flop; 172, a keyimg circuit for applying the output of the phase detector 168 to the first voltage sweep circuit; 173, a keying circuit for applying the output of the phase detector 168 to the second voltage sweep circuit 164; 174, and 175, terminals to which are applied the signal for controlling the keying circuits 172 and 173 through the flip-flop; and 176, a counter actuated in response to the output from the flip-flop 171.

It is assumed that the frequency of the third local oscillator 166 is $f_l$ whereas the tuned frequency of the tuned amplifier is $f_o$. Then two second intermediate frequencies $f_l - f_o$ and $f_l + f_o$ appear, and in response to these second intermediate frequencies, the outputs are derived from the tuned amplifier 167. These two intermediate frequencies are selected as the reference frequencies $f_1$ and $f_2$. The mode of the frequency sweep operation by the first and second local oscillators 161 and 163 is illustrated in FIG. 2. The solid lines illustrate the oscillation frequency of the first local oscillator whereas the dotted lines, the oscillation frequency of the second local oscillator 163. No further description will be made here because the mode of operation has been described in detail hereinbefore. As described in detail with reference to FIGS. 26-30, the reference frequencies $f_1$ and $f_2$ can be detected with a higher degree of accuracy. The effect of the embodiment is that since the multiplier circuit outside of the phase lock loop can detect whether the phase lock is in the steady state or not independently of the control voltage (very small error voltage) in the phase lock loop, the sufficiently large output for controlling the flip-flop can be obtained. The sweep voltage is controlled not only by the input $V_{in}$ into the integration circuit but also by the output of the phase detector. Thus, the phase lock is keyed, but immediately after the phase lock is keyed, the input voltage $V_{in}$ returns to zero so that only a short time is required before the steady state is reached. As a result, the channel selection time is reduced, and the operator may feel as if the channel were selected instantaneously. Furthermore, there is no fear of selecting an undesired channel especially when there are many channels for example in the UHF band because the flip-flop will not be actuated in response to the difference between the frequencies $f_1$ and $f_2$ other than that obtained in the steady state.

Due to the phase lock, the difference between the reference frequency and the sweep frequency can be detected with a higher degree of accuracy, and the error in frequency difference due to the transient characteristics can be eliminated as compared with the case in which the frequency discriminator having no phase lock is used. Therefore, no error in the highest channel in the UHF band having a large number of channels will occur.

When the second intermediate frequencies are further decreased by the third local oscillator 166, the phase detector functions satisfactorily even at low frequency, and only one reference frequency generator is required.

What is claimed is:

1. A frequency sweep device comprising a first sweep oscillator operating in a first predetermined frequency range, a second sweep oscillator operating in a second predetermined frequency range, first and second alternately operable sweep control means connected to control said first and second sweep oscillators respectively to sweep through the oscillation frequencies in their respective frequency ranges, means for detecting the difference in oscillation frequency between said first and second sweep oscillators, and means for reversing the operable states of said first and second sweep control means whenever the detected difference in oscillation frequency between said first and second sweep oscillators reaches a first or second predetermined frequency, whereby the stepwise frequency sweep can be accomplished alternately by said first and second sweep oscillators.

2. A frequency sweep device set forth in claim 1 wherein the variation in frequency of one of said first and second sweep oscillators during a period of operation of the corresponding control means is greater than the variation in frequency of the other sweep oscillator during a period of operation of the other control means.

3. A frequency sweep device set forth in claim 1 comprising starting means for setting one of said first and second sweep oscillators from a predetermined reference frequency.

4. A frequency sweep device set forth in claim 1 wherein said first and second sweep oscillators each comprise a variable reactance diode, means for applying a reference voltage to one terminal of said variable reactance diode for controlling the frequency sweep, said sweep control means comprise sweep voltage generator means, and the sweep voltage from the respective sweep voltage generator means is applied to the other terminal of said variable reactance diode.

5. A frequency sweep device set forth in claim 1 which further comprises means for starting alternate operation of said control means, and blanking pulse generating means for blanking the first output occurring of the frequency detection after the sweep has been started.

6. A frequency sweep device set forth in claim 1 wherein said detecting means for detecting the difference in oscillation frequency between said first and second oscillators includes means for mixing the outputs of said first and second oscillators to produce a first intermediate frequency signal, a third oscillator, mixing means for obtaining a second intermediate frequency signal by frequency-converting said first intermediate frequency signal with the oscillations of said third oscillator, and means for detecting the frequency of said second intermediate frequency signal, whereby said frequency detecting means detects the second intermediate frequency output in order to detect said difference in oscillation frequency between said first and second sweep oscillators.

7. A frequency sweep device as set forth in claim 1 wherein said detecting means for detecting the difference in oscillation frequency between said first and second sweep oscillators includes first and second reference frequency generators, two phase lock loops and means for alternately applying the output signals from said two reference frequency generators to said phase lock loops in response to the signal representative of said difference in oscillation frequency.

8. A sweep device set forth in claim 5 comprising means for generating a first pulse having a leading edge coinciding with the first output of said detecting means after the start of alternate operation of said control means, and wherein said blanking pulse generating means comprises means for causing the trailing edge of said blanking pulse to coincide with the trailing edge of said first pulse.

9. A frequency sweep device as set forth in claim 5 further comprising means generating a first pulse having a leading edge coinciding with operation of said starting means and a trailing edge coinciding with the second output of said detector means after operation of said starting means, and wherein said means for detecting the difference in oscillation frequency between said first and second sweep oscillators comprises two reference frequency generators, and means for temporarily stopping the oscillation of the reference frequency generator corresponding to the frequency to be detected first after the sweep has been started by said first pulse.

10. A frequency sweep circuit set forth in claim 6 wherein said frequency detecting means for said second intermediate frequency signal comprises a tuned circuit, and piezo-resonators in a portion of said tuned circuit.

11. A frequency sweep device set forth in claim 6 wherein said detector has an S-shaped characteristic curve, and in order to detect the frequency of said second intermediate frequency signal only at the inner side of the S-shaped characteristic curves, said detecting means comprises means for blanking a detecting pulse which is produced thereby in response to one of said first and second sweep oscillators after starting by said starting means.

12. A frequency sweep device set forth in claim 6 wherein said means for detecting the frequency of said second intermediate frequency signal includes reference frequency generator means, and phase lock loop means connected to key the signals from said reference frequency generator means in phase and said second intermediate frequency signal.

13. A frequency sweep device set forth in claim 6 further including reference frequency generator means, means for alternately keying said two sweep control means in phase, a multiplier circuit, means applying the output of said reference frequency generator, and said second intermediate frequency signal to said multiplier circuit in order to detect whether phase locking is accomplished or not, and means for reversing the operation states of said two sweep control means in response to the output from said multiplier circuit.

14. A channel selecting frequency sweep device comprising a first sweep oscillator operating in a first predetermined frequency range, a second sweep oscillator operating in a second predetermined frequency range, first and second alternately operable sweep control means connected to control said first and second sweep oscillators respectively to sweep through the oscillation frequencies in their respective ranges, means for detecting the difference in oscillation frequency between said first and second sweep oscillators, means for reversing the operable states of said first and second sweep control means whenever the detected difference in oscillation frequency between said first and second sweep oscillators reaches a first or second predetermined frequency, whereby the stepwise frequency sweep can be accomplished alternately by said first and second sweep oscillators, a counter for counting a number of reversals in sweep control operation made between said first and second sweep control means, and means for stopping said reversal and the sweep by said two sweep oscillators when the content of said counter reaches a predetermined value.

15. A frequency sweep device set forth in claim 14 wherein said means for stopping said reversal and said sweep includes a register for storing a predetermined channel number, a comparator for detecting whether the content in said register coincides with that in said counter or not, and means for stopping said reversal and said sweep when the contents of said register and counter coincides with each other.

16. A frequency sweep device set forth in claim 14 wherein said means for detecting the difference in oscillation frequency between said two sweep oscillators includes a mixer for mixing the outputs of said two sweep oscillators, an amplifier for amplifying the output from said mixer, and two trap means in said amplifier for detecting said first and second predetermined frequencies.

17. A channel selecting frequency sweep device comprising a high frequency amplifier, a first sweep oscillator which is a local oscillator, a mixer for mixing the outputs of said high frequency amplifier and said first sweep oscillator, a second sweep oscillator which is a local oscillator and is connected to the input terminal of said mixer, an intermediate frequency amplifier connected to the output terminal of said mixer, means for detecting whether or not the difference in oscillation frequency between said first and second sweep oscillators which is the output of said intermediate frequency amplifier reaches predetermined first or second frequencies, and means for alternating the frequency sweep operation between said first and second sweep oscillators in response to sequential detection of said first and second frequencies whereby the stepwise frequency sweep can be accomplished.

18. A frequency sweep device as set forth in claim 17 wherein the difference between said first and second frequencies is $1/n$ of carrier frequencies of adjacent channels, comprising counter means connected to count said alternate sweep operations of said oscillators, and said counter means counts a number which is $1/n$ of the number of stopping the sweeps by one of said first and second sweep oscillators, wherein the numeral n designates positive integers.

19. A frequency sweep device set forth in claim 17 wherein said means for detecting said first and second frequencies include first and second reference generators, and two phase lock loops connected to alternately keying the mixed output signal of the outputs of said first and second sweep oscillators with the output signals from said first and second reference frequency generators respectively, in phase.

20. A channel selecting frequency sweep device for a signal receiver comprising a high frequency amplifier, a first sweep oscillator which is a local oscillator operating in a first sweep frequency range, a mixer for mixing the outputs from said high frequency amplifier and said first sweep oscillator, a second sweep oscillator which is a local oscillator operating in a second sweep frequency range connected to the input terminal of said mixer, an intermediate frequency amplifier connected to the output terminal of said mixer, first and second alternately operable sweep control means connected to control said first and second sweep oscillators respectively to sweep through the oscillation frequencies in their respective ranges, means for detecting whether the difference in oscillation frequency between said first and second sweep oscillators which is the output of said intermediate frequency amplifier reaches a predetermined first or second frequency or not, means for reversing the operable states of said first and second sweep control means whenever said first or second frequency is detected, whereby the stepwise frequency sweep can be accomplished, a counter connected to count the number of said reversals of one of said two sweep control means, means for stopping the reversing of the operable states of said two sweep control means when the content in said counter reaches a predetermined value, and means for reducing amplification in said high frequency amplifier when said two sweep oscillators are alternately operating.

21. A frequency detector set forth in claim 20 comprising a main amplifier connected in parallel with said intermediate frequency amplifier.

* * * * *

UNITED STATES PATENT OFFICE

CERTIFICATE OF CORRECTION

Patent No. 3,798,553 Dated March 19, 1974

Inventor(s) Yoichi Sakamoto

It is certified that error appears in the above-identified patent and that said Letters Patent are hereby corrected as shown below:

Title Page, Left Column: The name of the Assignee is:

Matsushita Electric Industrial Co., Ltd.

Column 1, Line 7: The line should be deleted and replaced by --device especially adapted--

Line 25: After "sweep" insert --device--

Line 51: "reversal" should be --reversals--

Column17, Line 44: "keyimg" should be --keying--

Signed and Sealed this

*twentieth* Day of *January 1976*

[SEAL]

*Attest:*

RUTH C. MASON
*Attesting Officer*

C. MARSHALL DANN
*Commissioner of Patents and Trademarks*